(12) United States Patent
Fine et al.

(10) Patent No.: US 7,564,031 B2
(45) Date of Patent: Jul. 21, 2009

(54) SYSTEM AND METHOD FOR WIDE ANGLE OPTICAL SURVEILLANCE

(75) Inventors: Assa Fine, Shchenia (IL); Chanoch Miller, Gesher Haziv (IL)

(73) Assignee: Rafael Advanced Defence Systems Ltd., Haifa (IL)

( * ) Notice: Subject to any disclaimer, the term of this patent is extended or adjusted under 35 U.S.C. 154(b) by 0 days.

(21) Appl. No.: 11/817,795

(22) PCT Filed: Mar. 8, 2006

(86) PCT No.: PCT/IL2006/000307

§ 371 (c)(1),
(2), (4) Date: Sep. 5, 2007

(87) PCT Pub. No.: WO2006/095344

PCT Pub. Date: Sep. 14, 2006

(65) Prior Publication Data

US 2008/0191127 A1 Aug. 14, 2008

(30) Foreign Application Priority Data

Mar. 8, 2005 (IL) .................................... 167317
Sep. 15, 2005 (IL) .................................... 170875

(51) Int. Cl.
*G02B 26/10* (2006.01)
*H01J 5/16* (2006.01)
*H04N 5/247* (2006.01)
*G02B 13/16* (2006.01)

(52) U.S. Cl. .............. 250/334; 250/234; 348/264; 348/335

(58) Field of Classification Search ............... 250/334, 250/234–236, 342–348; 348/164, 39, E5.03, 348/368, 369, 342, 344, 367, 337, 338, 36, 348/37, 38, 154, 155, 124, 159, 218.1, 262, 348/264; 359/202, 203, 216
See application file for complete search history.

(56) References Cited

U.S. PATENT DOCUMENTS

| | | | |
|---|---|---|---|
| 3,804,976 A | 4/1974 | Gard | |
| 4,486,662 A | 12/1984 | Abel | |
| 4,532,867 A | 8/1985 | Mitchell | |
| 4,574,197 A * | 3/1986 | Kliever | 250/334 |
| 4,588,254 A | 5/1986 | Menke et al. | |
| 4,717,823 A * | 1/1988 | Steimel et al. | 250/236 |
| 5,016,109 A * | 5/1991 | Gaylord | 348/218.1 |
| 5,023,723 A | 6/1991 | Date et al. | |

(Continued)

*Primary Examiner*—Georgia Y Epps
*Assistant Examiner*—Jennifer Bennett
(74) *Attorney, Agent, or Firm*—Mark M. Friedman

(57) ABSTRACT

An imaging system (30, 30') and corresponding method has a two-dimensional imaging sensor array (32) and an associated optical system. The optical system includes at least one optical arrangement (34, 36α, 36b) defining a field of view (38α, 38b) of given angular dimensions and an optical switching mechanism (40) for alternately switching an optical axis of the imaging system between two directions (42α, 42b). The optical switching mechanism and the optical arrangement(s) are deployed such that the imaging sensor array generates images of at least two generally non-overlapping fields of view of equal angular dimensions and with diverging optical axes in fixed spatial relation. Rapid switching between the fields of view allows quasi-continuous monitoring of a larger field of view than would otherwise be possible while maintaining sensitivity to transient events. Also disclosed is an infrared search and tracking system based on such imaging systems.

27 Claims, 15 Drawing Sheets

U.S. PATENT DOCUMENTS

| | | |
|---|---|---|
| 5,049,740 A | 9/1991 | Pines et al. |
| 5,300,780 A | 4/1994 | Denney et al. |
| 5,347,391 A | 9/1994 | Cook et al. |
| 5,534,697 A | 7/1996 | Creekmore et al. |
| 5,657,073 A * | 8/1997 | Henley .................. 348/38 |
| 5,699,112 A | 12/1997 | Bacs, Jr. |
| 5,841,589 A * | 11/1998 | Davis et al. .................. 359/726 |
| 6,410,897 B1 * | 6/2002 | O'Neill .................. 250/203.6 |
| 6,424,460 B1 | 7/2002 | Kirkham |
| 6,556,282 B2 | 4/2003 | Jamieson et al. |
| 6,570,609 B1 * | 5/2003 | Heien .................. 348/148 |
| 6,614,533 B1 * | 9/2003 | Hata .................. 356/454 |
| 6,778,220 B2 | 8/2004 | Glenn |
| 2003/0081113 A1 | 5/2003 | Kawai |
| 2004/0046123 A1* | 3/2004 | Dausch .................. 250/351 |
| 2004/0080623 A1* | 4/2004 | Cleveland et al. .......... 348/208.1 |
| 2005/0190082 A1* | 9/2005 | Kumata et al. .......... 340/995.1 |

\* cited by examiner

SYSTEM AND METHOD FOR WIDE ANGLE OPTICAL SURVEILLANCE

FIELD AND BACKGROUND OF THE INVENTION

The present invention relates to a method and system for optical surveillance of a wide angle or panoramic field of view.

In certain imaging applications, an extremely wide field of view (120° or more) optical system is required so that a very large two dimensional region of the object space may be monitored either continuously or repeatedly at short intervals. Examples of such application include: full earth surveillance from low altitude space platforms, missile launch warning from an airborne platform, and air-borne threat detection from a ground base location or a waterborne vessel.

One approach to monitoring such large fields of view is the use of a scanning linear detector array. Examples of this approach are described in patent publications U.S. Pat. No. 5,347,391 and EP 1416312 A1. Although such systems offer a cost-efficient solution for scanning large regions, they suffer from a number of shortcomings. Most notably, a scanning linear detector array by its very nature actually views each given pixel of object space for a very small proportion of each scanning cycle. As a result, there is a significant risk of transient events, such as the brief flash accompanying the launch of a missile, being missed between scans of the sensor.

An alternative approach is to use staring imaging sensors to monitor the region of interest. Examples of systems employing staring imaging sensors include patent publications U.S. Pat. Nos. 6,410,897 B1, 5,534,697 A and 5,300,780 A. In most cases, in order to achieve acceptable resolution and avoid problems caused by optical distortion, the field of view of each imaging sensor should be limited to 40-60°. In order to cover a larger solid-angle field of view, a scanning pattern is typically used, resulting in similar problems as described in the context of linear detector arrays discussed above. For truly continuous non-scanned monitoring of a large field-of-view at an acceptable resolution, a large number of imaging sensors deployed with overlapping fields-of-view would be required, thereby rending the system very expensive.

One non-limiting example used to illustrate the present invention is that of protection of naval platforms (waterborne vessels or ships). Ships are relatively vulnerable to attack by many kinds of missiles, such as sea-skimming missiles and gliding bombs, and successful deployment of various countermeasures for their defense is dependent upon early detection of incoming threats. Radar has for decades been the standard technique for search and tracking of airborne threats for naval and other air defense systems. Radar is problematic, however, since it requires active transmission of radio pulses which give away the presence of the vessel carrying the tracking system and may be used as a guide beacon to guide offensive armaments towards the vessel. To avoid this problem, attempts have been made to develop passive (i.e., non-transmitting) search and tracking systems based upon optical sensors, and in particular, infrared search and tracking (IRST) systems.

Naval applications highlight the aforementioned shortcomings of both scanning and staring systems. Implementation of IRST systems for naval applications poses particular problems in the trade-off between sufficient sensitivity and avoidance of false alarms. Air-borne threat detection requires an extremely wide field of view, typically covering an azimuth of substantially 360°. During the short time-on-target (or "dwell time") of a scanning system, the background optical noise of solar glint from the moving surface of the water is almost indistinguishable from the heat emission of a head-on incoming missile. As a result, scanning systems tend to suffer from insurmountable problems of high false alarm rates. If a staring system is used, although the dwell time problem is solved, a different problem of resolution vis-à-vis cost limitations arises. In order to achieve reliable detection of a head-on missile threat at sufficient range to be useful, an angular pixel resolution of at least two, and preferably at least four, pixels per mille-radian is required. To achieve this resolution with conventional imaging arrays of several hundred pixels dimensions, as many as 40-80 imaging sensors would be required, rendering the system overly expensive.

In other contexts, it has been proposed to use a single imaging sensor with optical multiplexing to perform more than one imaging function. Examples include the aforementioned U.S. Pat. No. 6,410,897 B1 where a movable mirror is used to switch the optical sensor between a wide field of view optical objective and a narrow field of view optical objective. A similar concept of switching between narrow and wide fields of view is also disclosed in U.S. Pat. Nos. 5,049,740, 4,486,662 and 3,804,976. Another example disclosed in U.S. Pat. No. 4,574,197 provides a scanning rotating polygon which offers two fields of view used for stereoscopic viewing or for two independently steerable optical telescopes for display on separate screens. None of these references discloses optical multiplexing to offer two similar fields of view with different optical axes in fixed spatial relation as a solution for a staring surveillance system.

A further limitation of the aforementioned existing systems with optical multiplexing is that the optical switching frequency is typically limited by the read cycle rate of the sensor, i.e., the period taken to expose the array to incoming illumination and then read the resulting information from an array of capacitors associated with each sensor element. In order to avoid mixing of the content of the two images, the sensor array is exposed for a first integration time to the first field-of-view, the associated capacitors are read (a first read cycle), and then the sensor array is exposed to the second field of view and the capacitors are again read (a second read cycle). This mode of operation is referred to as "Read Then Integrate (RTI). For surveillance applications in which it is desired to detect transient events of duration similar to or less than the read-cycle of the sensor, this arrangement is problematic since an event may occur while the other field of view is being viewed and may therefore be missed by the sensor.

Finally, in the field of staring sensors with a single field of view, there exists a technique known as "Read While Integrate" (RWI) which substantially avoids dead-time during the output reading process between integration periods of a sensor. This technique is particularly useful when monitoring for transient flash events since it helps to ensure that even a transient event is picked-up by the sensor. "Read While Integrate" also effectively doubles the rate at which frames can be acquired using an array of light-sensitive sensors that produce electrical charge when the light that they are sensitive to impinges on them. The principle of RWI will now be illustrated with reference to FIGS. 1 and 2.

Specifically, FIG. 1 shows one such sensor 10, for example an InSb detector sensitive to infrared light, coupled alternately to two capacitors 12 and 14 by a switch 16. Capacitors 12 and 14 in turn are alternately coupled to a readout circuit 18 by a switch 20. When a capacitor 12 or 14 is coupled to sensor 10, the capacitor 12 or 14 receives and accumulates ("integrates") the electrical charge produced by sensor 10 as a consequence of the light impinging on sensor 10. When a capacitor 12 or 14 is coupled to readout circuit 18, readout circuit 18 reads the charge accumulated in the capacitor 12 or 14 and discharges the capacitor 12 or 14.

FIG. 2 shows the sequence of integration and readout used in the prior art RWI method to acquire images using an array of sensors 10 coupled to respective capacitors 12 and 14 and respective readout circuits 18 as illustrated in FIG. 1. Time increases from left to right in FIG. 2. During odd-numbered time intervals, capacitors 12 accumulate electrical charges while readout circuits 18 read the electrical charges accumulated in capacitors 14 during the immediately preceding time intervals. During even-numbered time intervals, capacitors 14 accumulate electrical charges while readout circuits 18 read the electrical charges accumulated in capacitors 12 during the immediately preceding time intervals. The read cycle, i.e., the period between successive readings from the same capacitor, corresponds to a pair of time intervals. The diagonal arrows in FIG. 2 show the timing of the flow of accumulated electrical charge from the capacitors 12 or 14 to readout circuits 18. Note that FIG. 1 illustrates the settings of switches 16 and 20 during odd-numbered time intervals.

Although RWI provides an effective solution for substantially continuous monitoring of an imaging system field of view, it is of limited value where a single imaging sensor is used to switch between two or more fields of view since each field of view would still remain unmonitored for at least half the read cycle.

There is therefore a need for a wide field-of-view surveillance system based upon staring imaging sensors which would employ optical switching to provide quasi-continuous monitoring of a wide-angle field of view while requiring fewer imaging sensors than would otherwise be required for full field of view coverage. It would also be advantageous to provide an infrared search and tracking system which would provide an effective passive alternative to radar for detecting threats to platforms, such as waterborne vessels.

SUMMARY OF THE INVENTION

The present invention is a method and system for optical surveillance of a wide angle or panoramic field of view.

According to the present invention there is provided an imaging system comprising: (a) a two-dimensional imaging sensor array; and (b) an optical system including: (i) at least one optical arrangement associated with the imaging sensor array and defining a field of view of given angular dimensions; and (ii) an optical switching mechanism for alternately switching an optical axis of the imaging system between a first direction and a second direction, the optical switching mechanism and the at least one optical arrangement being deployed such that the imaging sensor array generates images of at least two substantially non-overlapping fields of view of equal angular dimensions, the substantially non-overlapping fields of view having diverging optical axes in fixed spatial relation.

According to a further feature of the present invention, the optical switching mechanism includes an apparatus that is alternately substantially transparent and substantially reflective.

According to a further feature of the present invention, the optical switching mechanism includes a rotatable disk including at least one pair of alternating segments, a first segment of each the pair being transparent and a second segment of each the pair being reflective.

According to a further feature of the present invention, the at least one pair includes at least two pairs of segments, wherein the transparent segments are transparent to non-identical ranges of wavelengths and the reflective segments are reflective to non-identical ranges of wavelengths.

According to a further feature of the present invention, the optical switching mechanism includes a plurality of micro-electromechanical shutters, the apparatus being substantially transparent when the shutters are open and substantially reflective when the shutters are closed.

According to a further feature of the present invention, the optical switching mechanism includes a pair of prisms and a prism displacement mechanism operative to displace at least one of the pair of prisms such that the pair of prisms are alternately adjacent and apart, the apparatus being substantially transparent when the prisms are adjacent and substantially reflective when the prisms are apart.

According to a further feature of the present invention, there is provided an imaging assembly comprising a plurality of the aforementioned imaging systems, wherein the imaging systems are deployed in fixed spatial relation such that the substantially non-overlapping fields of view of the plurality of imaging systems together form a substantially contiguous effective field of view spanning at least 120°, and preferably at least 180°, and most preferably substantially 360°.

According to a further feature of the present invention, the plurality of the imaging systems includes at least three of the imaging systems.

According to a further feature of the present invention, the optical switching mechanism switches between the fields of view at a field-of-view switching rate, the imaging system further comprising a read arrangement for reading accumulated information from the two-dimensional imaging sensor array at a read cycle rate, wherein the field-of-view switching rate is greater than the read cycle rate.

According to a further feature of the present invention, there are also provided: (a) a first set of read capacitors including a capacitor associated with each sensor element of the two-dimensional imaging sensor array; (b) a second set of read capacitors including a capacitor associated with each sensor element of the two-dimensional imaging sensor array; and (c) a sensor switching arrangement associated with the two-dimensional imaging sensor array, the first and second sets of read capacitors and the optical switching mechanism, the sensor switching arrangement being configured to switch connections from each sensor element of the two-dimensional imaging sensor array between corresponding capacitors of the first and second sets of read capacitors synchronously with switching of the optical switching mechanism between the two fields of view such that the first set of read capacitors accumulate information corresponding to a first of the two fields of view and the second set of read capacitors accumulate information corresponding to a second of the two fields of view.

According to a further feature of the present invention, the sensor switching arrangement switches the connections at a field-of-view switching rate, the imaging system further comprising a read arrangement for reading accumulated information from the first and second sets of read capacitors at a read cycle rate, wherein the field-of-view switching rate is greater than the read cycle rate.

According to a further feature of the present invention, there are also provided: (a) a third set of read capacitors including a capacitor associated with each sensor element of the two-dimensional imaging sensor array; and (b) a fourth set of read capacitors including a capacitor associated with each sensor element of the two-dimensional imaging sensor array, wherein the sensor switching arrangement and the read arrangement are further associated with the third and fourth sets of read capacitors, the sensor switching arrangement and the read arrangement being configured such that: (i) during a first half of the read cycle, the sensor switching arrangement switches connections from each sensor element of the two-dimensional imaging sensor array between corresponding capacitors of the first and second sets of read capacitors synchronously with switching of the optical switching mechanism between the two fields of view while the read arrangement reads the third and fourth sets of read capacitors; and (ii) during a second half of the read cycle, the sensor switching arrangement switches connections from each sensor element of the two-dimensional imaging sensor array between corresponding capacitors of the third and fourth sets of read capacitors synchronously with switching of the optical switching mechanism between the two fields of view while the read arrangement reads the first and second sets of read capacitors.

According to a further feature of the present invention, there is also provided a processor configured for analyzing a sequence of images from the imaging system to determine whether they indicate the presence of a transient event.

There is also provided according to the teachings of the present invention, an infrared search and tracking (IRST) system for a waterborne vessel, the system comprising: (a) at least one stabilized platform; and (b) an imaging assembly deployed on the at least one stabilized platform, the imaging assembly including a plurality of the aforementioned imaging systems, wherein the imaging systems are deployed in fixed spatial relation such that the fields of view of the plurality of imaging systems together form a substantially contiguous effective field of view spanning substantially 360°.

According to a further feature of the present invention, the at least one stabilized platform is implemented as a plurality of the stabilized platforms, and wherein each of the stabilized platforms carries a corresponding subgroup of the plurality of imaging systems, the subgroup providing fields of view which together form a substantially contiguous effective field of view spanning a corresponding given angle, the corresponding given angles together substantially spanning 360°.

According to a further feature of the present invention, the at least one stabilized platform is implemented as two stabilized platforms for deployment on opposite sides of the waterborne vessel, and wherein a first of the stabilized platforms carries a first subgroup of the plurality of imaging systems, the first subgroup providing fields of view which together form a substantially contiguous effective field of view spanning at least a first angle, and wherein the second of the stabilized platforms carries a second subgroup of the plurality of imaging systems, the second subgroup providing fields of view which together form a substantially contiguous effective field of view spanning at least 360° minus the first angle, the first and second subgroups thereby together providing an effective field of view substantially spanning 360°.

According to a further feature of the present invention, the at least one stabilized platform is stabilized to within a predefined level of precision, the system further comprising a fine stabilization arrangement including: (a) an inertial sensor arrangement associated with the stabilized platform for measuring residual motion of the stabilized platform; and (b) a processing system responsive to the inertial sensor arrangement to process images from the imaging assembly so as to correct the images so as to compensate for the residual motion.

According to a further feature of the present invention, each of the fields of view for each imaging system has a spatial resolution of at least two pixels per mille-radian.

According to a further feature of the present invention, the substantially contiguous effective field of view spans substantially 360° in azimuth and spans a range of at least about 8° in elevation.

According to a further feature of the present invention, there is also provided a processing system associated with the imaging assembly and configured to process images from the imaging systems according to a set of target detection criteria to identify suspected targets.

According to a further feature of the present invention, the target detection criteria include substantially continuous detection of a suspected target for a period in excess of about half a second.

According to a further feature of the present invention, there is also provided a gimbaled narrow field-of-view infrared imaging sensor having a field of view not greater than about 3°, the gimbaled narrow field-of-view infrared imaging sensor being associated with the processing system for directing towards suspected targets for evaluation of the suspected targets.

According to a further feature of the present invention, the optical switching mechanism is configured to switch the optical axis of the imaging system in two non-parallel switching planes such that each imaging system generates images of at least four fields of view forming a two-dimensional array of fields of view.

There is also provided according to the teachings of the present invention, an infrared search and tracking (IRST) system comprising an imaging assembly including a plurality of the aforementioned imaging systems, wherein the imaging systems are deployed in fixed spatial relation such that the fields of view of the plurality of imaging systems together form a substantially contiguous effective field of view spanning at least about 40°.

There is also provided according to the teachings of the present invention, a method for acquiring images of two fields of view using a single two-dimensional imaging sensor array, the method comprising: (a) providing an optical arrangement including an optical switching mechanism for alternately directing an image of the two fields of view onto the imaging sensor array; (b) providing for each sensor of the imaging sensor array at least one pair of read capacitors and a sensor switching arrangement for switching a connection from each of the sensors between the corresponding pair of read capacitors; (c) synchronously operating the optical switching mechanism and the sensor switching arrangement at a field-of-view switching rate such that a first of the pair of read capacitors accumulates information corresponding to a pixel of a first of the fields of view and a second of the pair of read capacitors accumulates information corresponding to a pixel of a second of the fields of view; and (d) reading accumulated information from the pairs of read capacitors at a read cycle rate so as to acquire a sequence of images of each of the two fields of view, wherein the field-of-view switching rate is greater than the read cycle rate.

According to a further feature of the present invention, the field-of-view switching rate is at least four times the read cycle rate.

According to a further feature of the present invention, the sequence of images is analyzed to determine whether they indicate the presence of a transient event.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method and system for optical surveillance of a wide angle or panoramic field of view.

The principles and operation of methods and systems according to the present invention will be better understood with reference to the drawings and the accompanying description.

Figure 3:
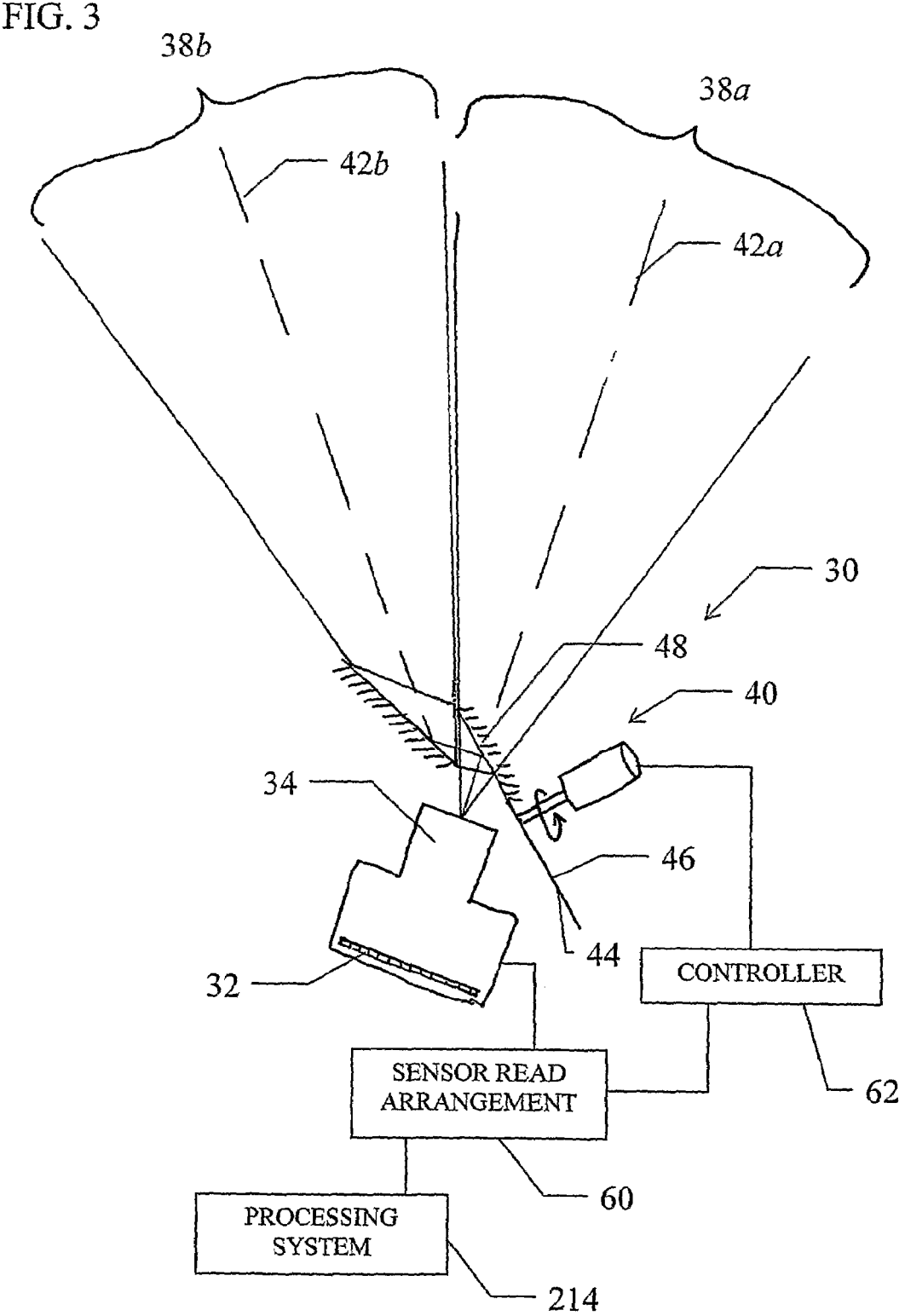
FIG. 3 illustrates a first implementation of an imaging system constructed and operative according to the teachings of the present invention.
Figure 4:
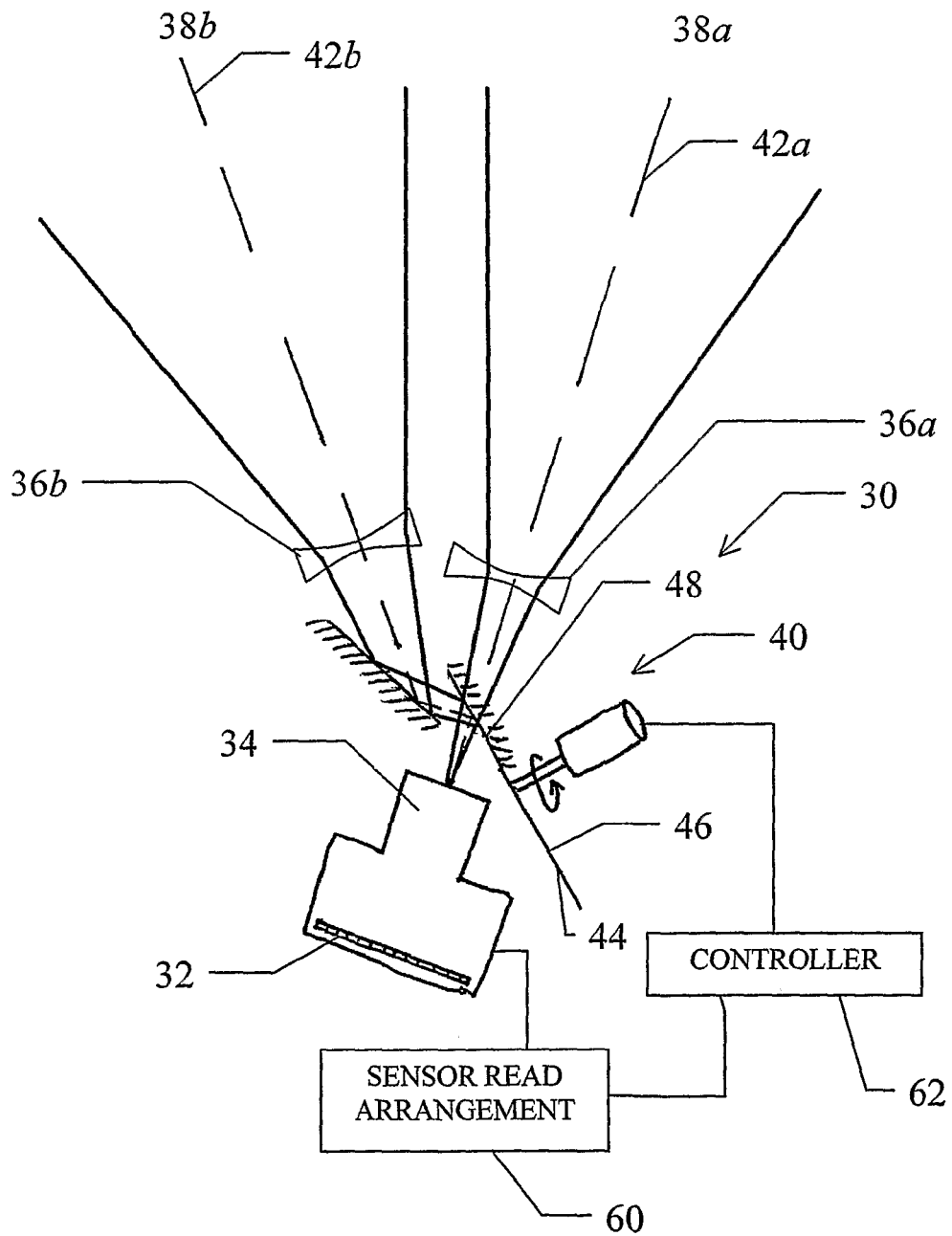
FIG. 4 illustrates a variant implementation of the imaging system of FIG. 3.

Turning now to the drawings, FIGS. 3-11B illustrate various preferred embodiments of an imaging system, generally designated 30, 30', constructed and operative according to the teachings of the present invention. FIGS. 12-17, described below, will then present a particularly preferred but non-limiting exemplary implementation of the present invention as part of an infrared search and track (IRST) system for naval platforms. Referring first particularly to FIGS. 3 and 4, generally speaking, imaging system 30, 30' includes a two-dimensional imaging sensor array 32 and an optical system including: at least one optical arrangement 34, 36a, 36b defining a field of view 38a, 38b of given angular dimensions; and an optical switching mechanism 40. Optical switching mechanism 40 is configured to alternately switch an optical axis of the imaging system between a first direction 42a and a second direction 42b. Optical switching mechanism 40 and the at least one optical arrangement 34, 36a, 36b are deployed such that imaging sensor array 32 generates images of at least two substantially non-overlapping fields of view 38a, 38b of equal angular dimensions with diverging optical axes in fixed spatial relation.

At this stage, it will already be appreciated that the present invention offers profound advantages of economy in cost and size by employing a single imaging sensor array with optical switching for monitoring double the non-switched field of view without any loss of spatial resolution. Thus, if an imaging system with its associated optics is configured to provide a basic field of view spanning 60°, the present invention may be employed to provide images spanning 120° using the same single optical sensor and without loss of spatial resolution. This principle can be extended by employing more than one optical switching mechanism 40 to monitor three or more fields of view using a single sensor, as illustrated schematically in FIGS. 11A and 11B. Furthermore, a small group of imaging systems may be used together to span wide angle or even panoramic views, as illustrated schematically in FIG. 10. These and other advantages of the present invention will become clearer from the following description.

Before addressing the features of the present invention in detail, it will be useful to define certain terminology as used herein in the description and claims. Firstly, reference is made to fields of view which are "substantially non-overlapping". This phrase is used to refer to fields of view which primarily cover different regions, but does not exclude the possibility of slight overlap at the periphery of the regions. To the contrary, it is typically preferred that the different fields of view have slight overlap (typically less than 5%) in order to ensure complete coverage of the combined region. Fields of view with peripheral overlap of this type are within the scope of "substantially non-overlapping" as used herein.

The term "two-dimensional imaging sensor array" is used herein to refer to any and all types of two-dimensional imaging sensor array, or "focal-plane array". The type of sensor used, and the design of the associated optical components, is chosen according to the wavelengths of radiation to be sensed, as is well known to those ordinarily skilled in the art. Thus, the imaging sensor array may be a visible or near-infrared sensor chip of CCD or CMOS type, an ultraviolet sensor chip, or a far-infrared sensor of any type. For the preferred applications of the present invention for detection of missile threats or the like, infrared sensor arrays sensitive to radiation in the micron-range, and most preferably, an imaging sensor based on InSb detectors sensitive to infrared radiation of wavelengths between 3 and 5 microns.

Figure 1:
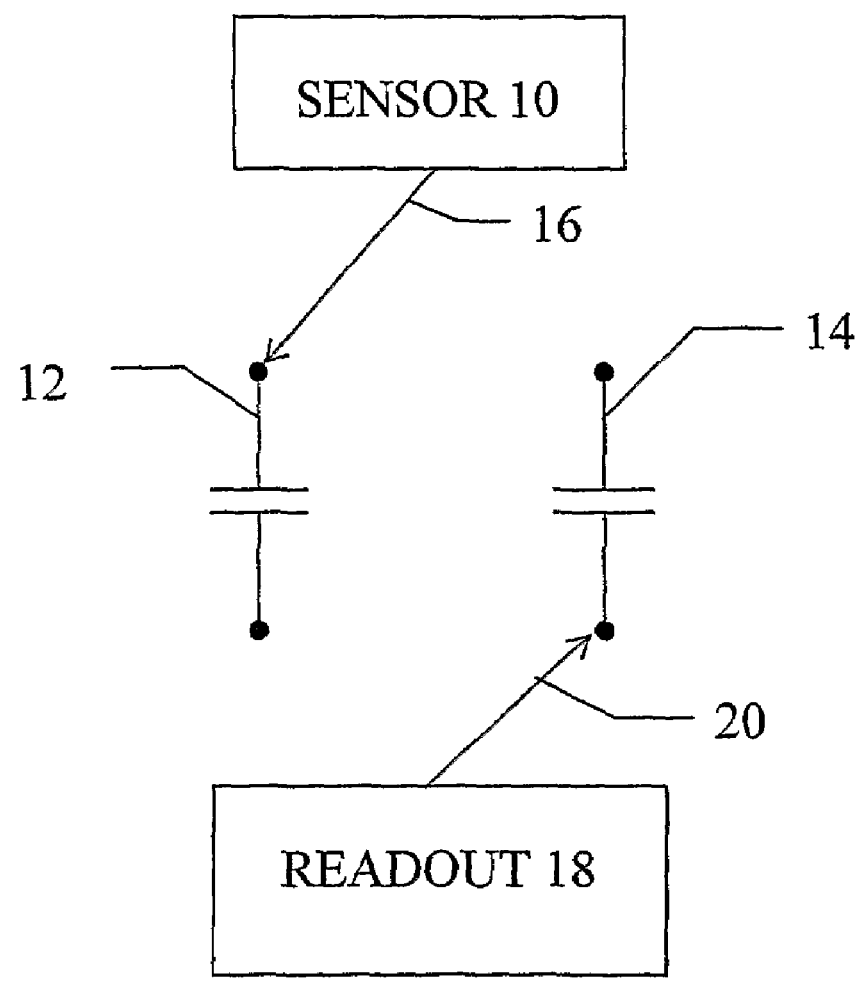
FIG. 1, described above, illustrates a read-while-integrate sensor of the prior art.
Figure 2:
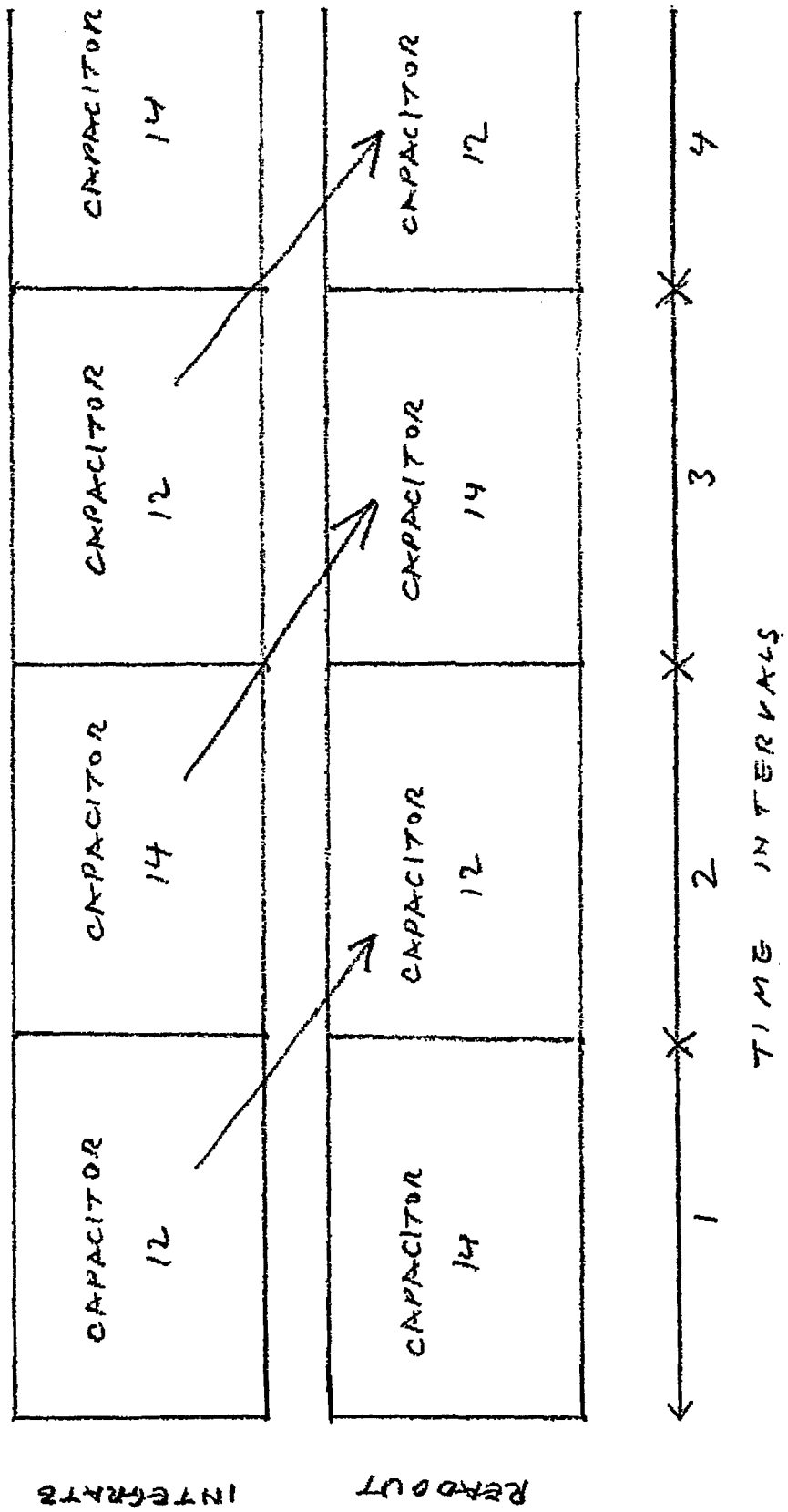
FIG. 2, described above, is a timing chart for the prior art sensor of FIG. 1.
Figure 5A:
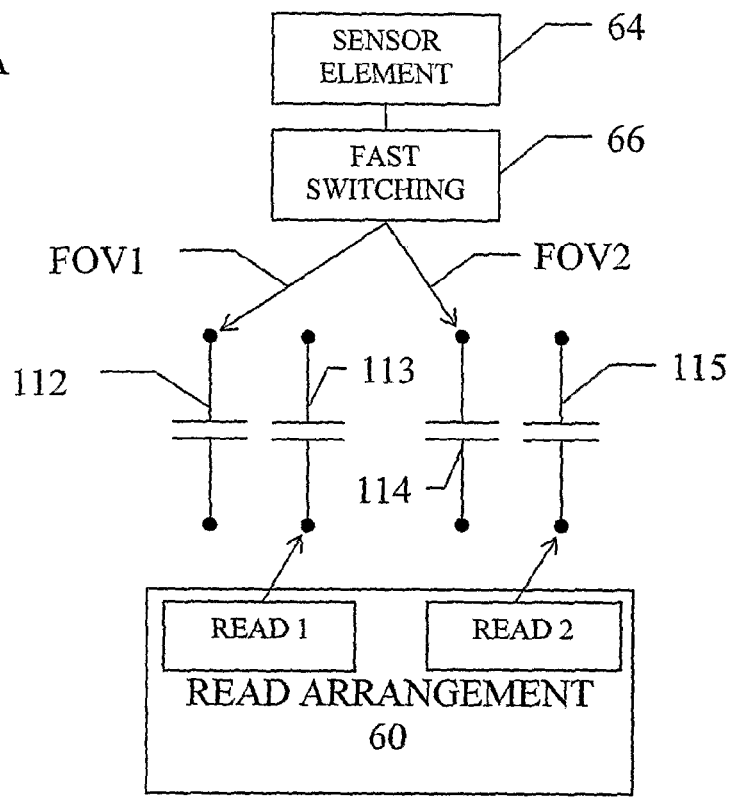
FIGS. 5A and 5B are schematic representations of components of a preferred implementation of a sensor assembly for use in the imaging system of FIG. 3 or 4, the components being shown in first and second states, respectively.
Figure 5B:
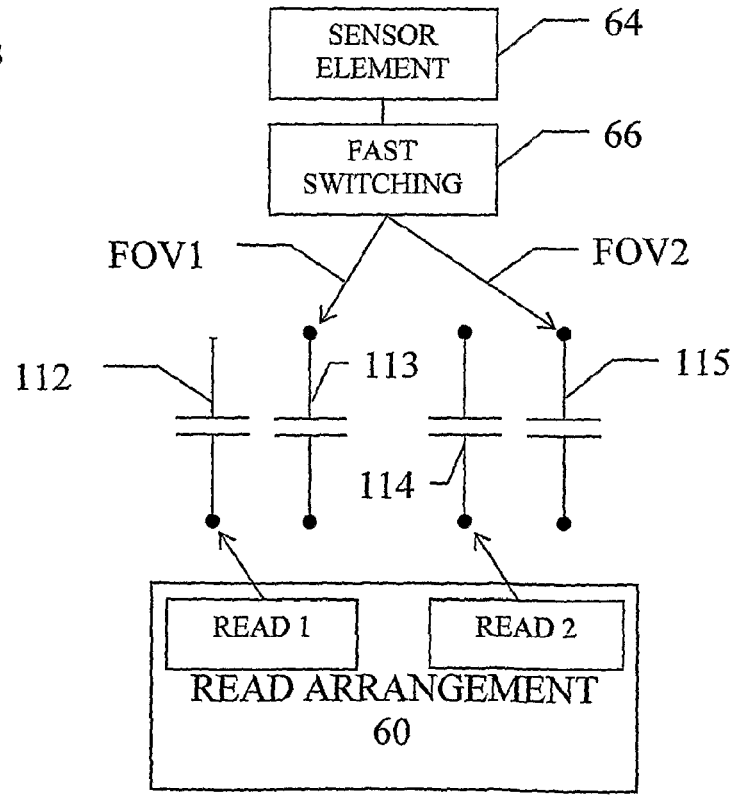
Figure 6:
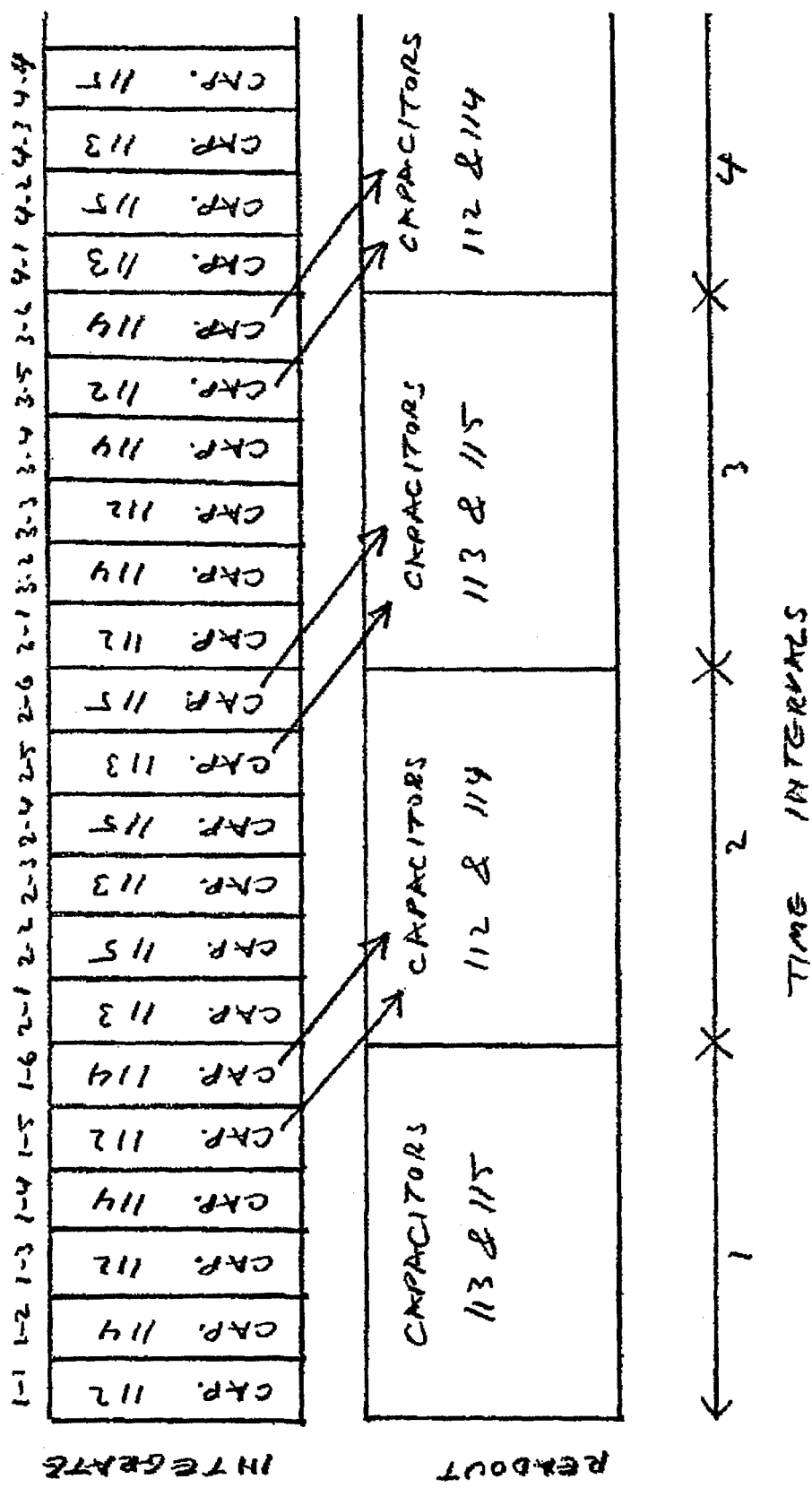
FIG. 6 is a timing chart for the sensor assembly of FIGS. 5A and 5B.

It should be noted that the illustrations of read circuitry in FIGS. 1, 5A and 5B are schematic for the purpose of illustrating the operating principles of the read circuitry. Clearly, the specific Implementation of the circuitry depends upon the type of sensor used, as will be clear to one ordinarily skilled in the art.

Turning now to the features of imaging system 30 in more detail, optical switching mechanism 40 typically includes an apparatus that is alternately substantially transparent and substantially reflective. Preferably, a high speed switching arrangement is used, capable of switching between its two states with a transition of less than one millisecond. One or more additional reflective element (e.g., a mirror) is typically used as shown to ensure the desired geometrical relation between the fields of view, as will be clearly understood.

Figure 7A:
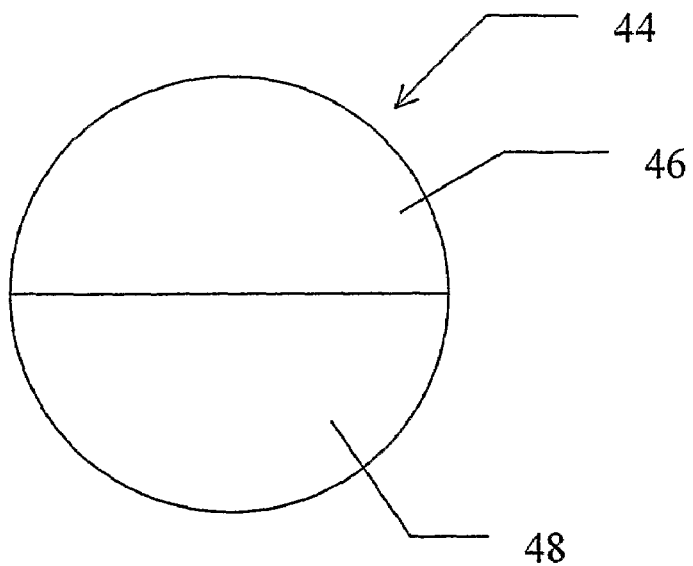
FIGS. 7A and 7B illustrate two implementations of a rotating disk for use in an optical switching arrangement in the imaging system of FIG. 3 or 4.

In the preferred implementations of FIGS. 3 and 4, optical switching mechanism 40 is based upon a rotatable disk 44 including at least one pair of alternating segments, a first segment 46 of each pair being transparent and a second segment 48 of each pair being reflective. A two-segment implementation of disk 44 is illustrated in FIG. 7A. The disk is preferably driven by a synchronous electric motor.

Figure 7B:
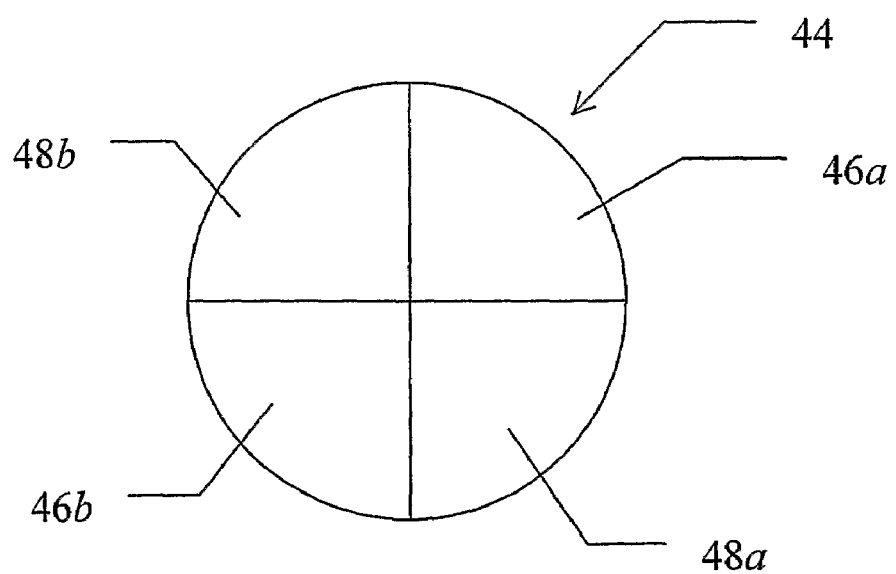

FIG. 7B shows a further preferred implementation in which at least one pair of segments 46a and 48a are selectively transparent and reflective, respectively, in a selected wavelength band. The possibility of adding selective filtering provides an additional option for reducing false alarm rates (FAR) for flash detection. Specifically, it is known that a flash event such as launch of a missile produces an intensity peak at wavelengths between 4.0 and 4.8 microns. Thus, in the preferred case of an imaging sensor of InSb detectors sensitive to infrared radiation of wavelengths between 3 and 5 microns, segment 46a is implemented as a bandpass filter with a passband between 4.5 and 4.8 microns and 46b is implemented as an absorptive bandpass filter that passes only wavelengths below 4 microns and absorbs other wavelengths. Similarly, segment 48a is implemented as a dichroic mirror that reflects only wavelengths between 4.5 and 4.8 microns while segment 48b is implemented as a dichroic mirror that reflects only wavelengths below 4 microns and absorbs other wavelengths. In this way, each revolution of the disk generates two image exposures of each FOV in different wavelength bands. By comparing the resulting images, it is possible to distinguish reliably between genuine "flash" events which have a large differential between the two bands and other transient intensity peaks such as the glint of sunlight reflected from a moving surface which tend to be relatively evenly dispersed between the two wavelength bands.

Figure 8A:
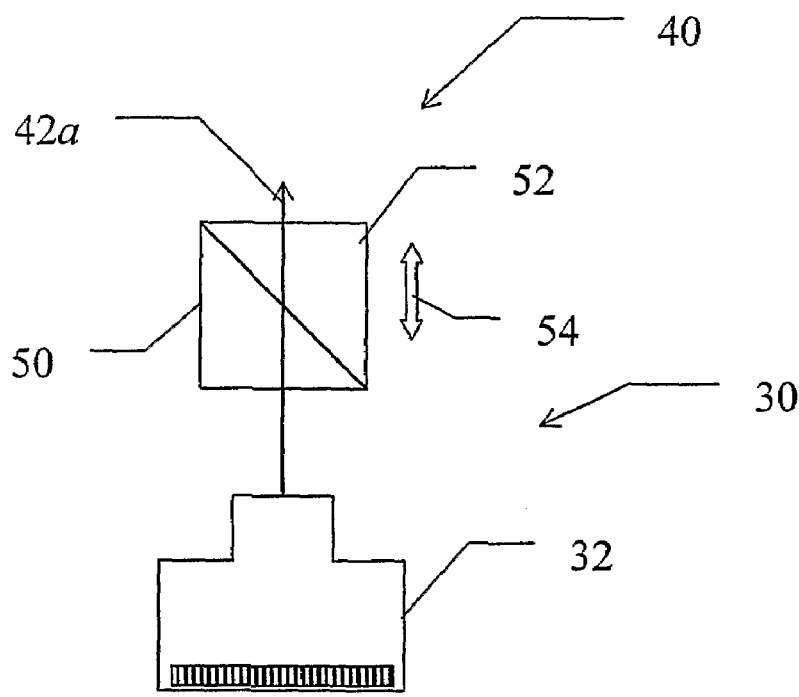
FIGS. 8A and 8B illustrate schematically an alternative implementation of an optical switching arrangement based upon relative displacement of a pair of prisms, shown in a transmitting state and a reflecting state, respectively.
Figure 8B:
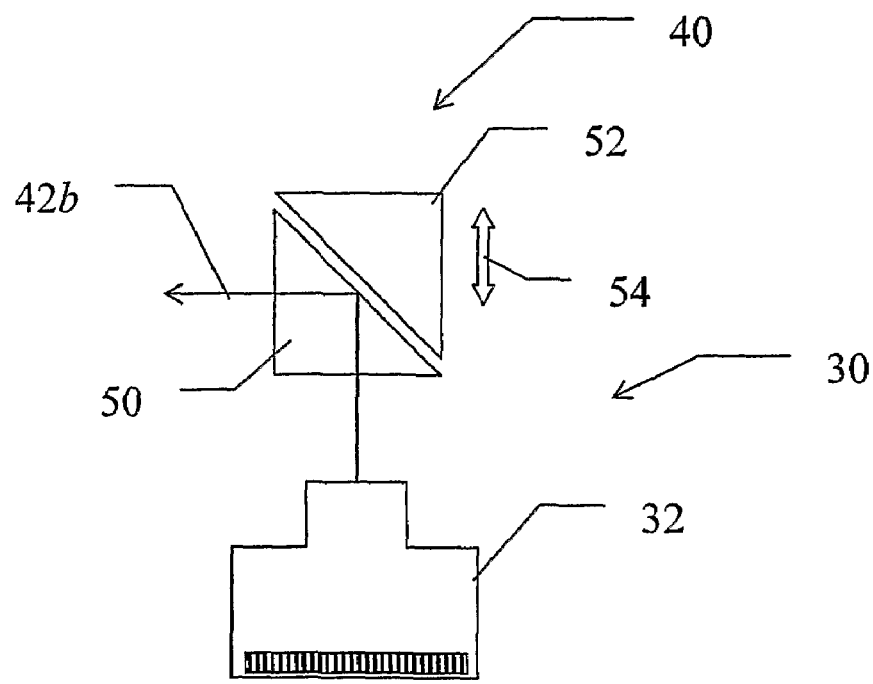

Turning now to FIGS. 8A and 8B, there is shown schematically an alternative implementation of optical switching mechanism 40 including a pair of prisms 50, 52 and a prism displacement mechanism (represented here schematically by arrow 54) operative to displace at least one of prisms 50, 52 such that prisms 50, 52 are alternately adjacent (as in FIG. 8A) to provide a substantially transparent state in which total internal reflection is frustrated and apart (as in FIG. 8B) to provide a substantially reflective state by total internal reflection.

Figure 9A:
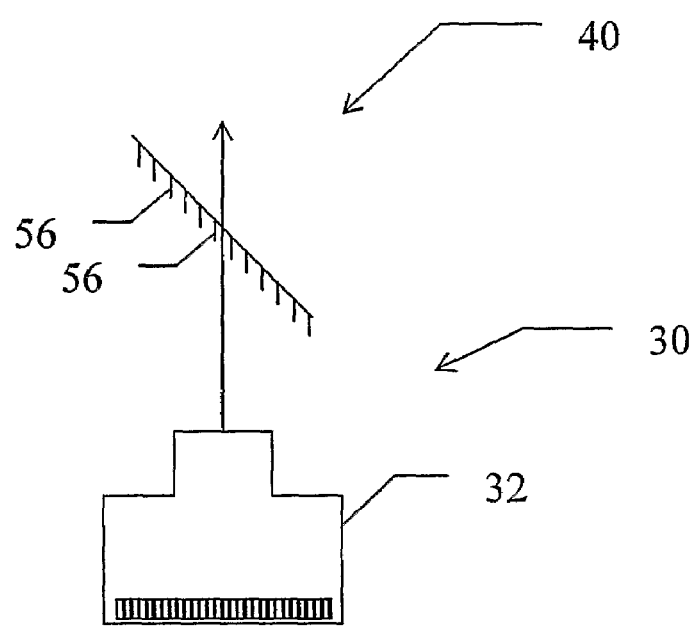
FIGS. 9A and 9B illustrate schematically an alternative implementation of an optical switching arrangement employing micro-electromechanical shutters shown in an open and closed state, respectively.
Figure 9B:
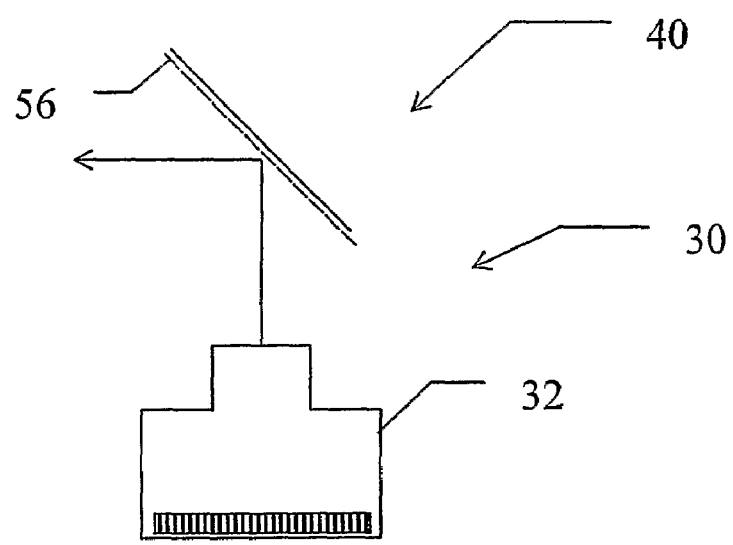
Figure 10:
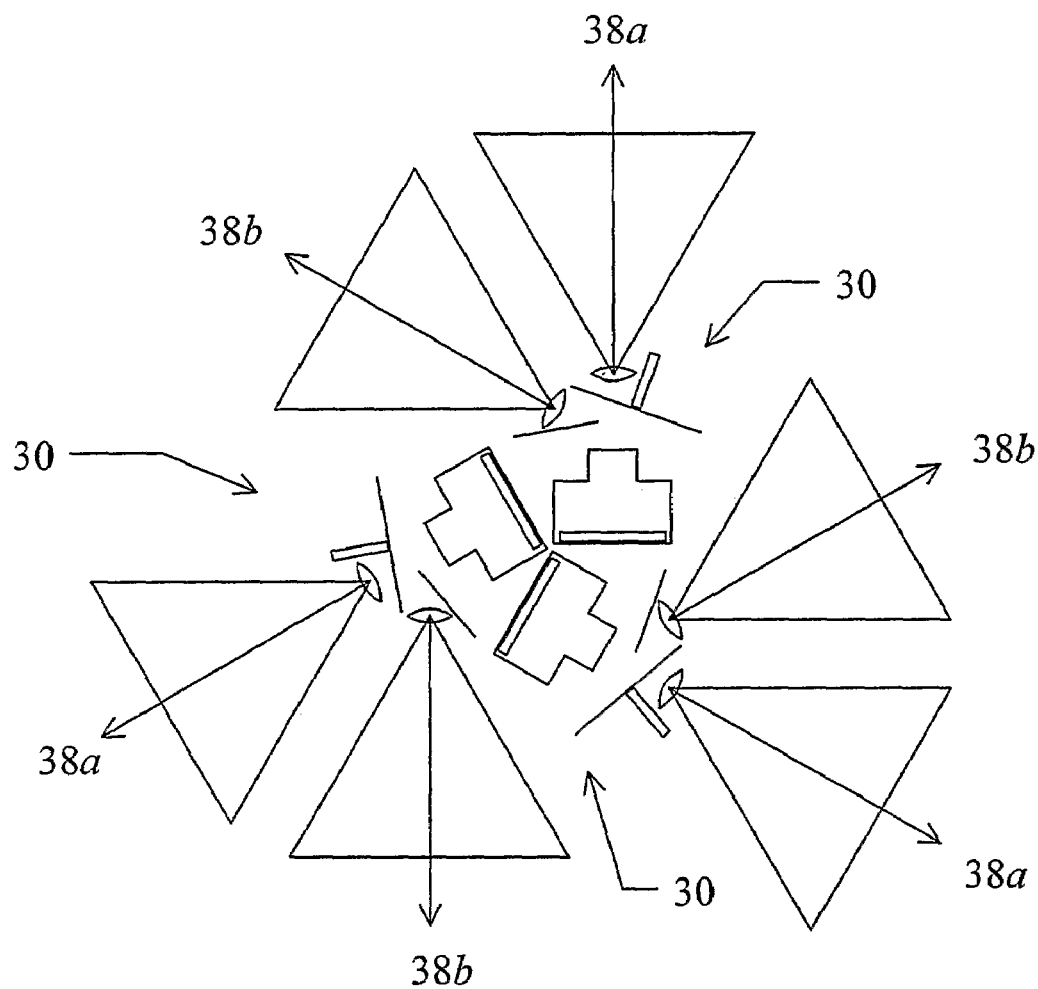
FIG. 10 shows three of the imaging systems of FIG. 4 deployed for monitoring a full 360 degrees of azimuth.

Turning now to FIGS. 9A and 9B, there is shown schematically an alternative implementation of optical switching mechanism 40 including a plurality of reflective micro-electromechanical shutters 56. In this case, the mechanism is substantially transparent when shutters 56 are open (FIG. 9A) and substantially reflective when shutters 56 are closed (FIG. 9B). Such a mechanism can be implemented using, for example, the technology described in PCT publication no. WO02/13168. Suitable micro-electromechanical shutter elements are commercially available from Flixel Ltd., (Tel Aviv, Israel).

Referring briefly specifically to FIG. 4, it should be noted that this is similar to the implementation of FIG. 3 except for the use of an optical arrangement to reduce the size of a footprint of the optical bundle passing through optical switching mechanism 40. This is typically achieved by designing the optics to provide an intermediate image plane at or near optical switching mechanism 40. This allows the optical switching mechanism to be more compact than would otherwise be possible. In all other respects, the implementation of FIG. 4 is fully analogous in structure and operation to that of FIG. 3.

Turning now to the remaining features of imaging system 30, these include a sensor read arrangement 60 for reading data (typically accumulated charge) from sensor elements of the two-dimensional imaging sensor array and a controller 62 for controlling synchronous operation of the optical switching mechanism and the read arrangement to ensure correct separation of data from the two fields of view. Data from read arrangement 60 is transferred to a processing system 214 for subsequent image processing, preferably analyzing a sequence of images from the imaging system to determine whether they indicate the presence of a transient event. One example of the operation of processing system 214 will be addressed further below.

As mentioned above, switching between different fields of view may present problems for detection of flash events (e.g. a missile launch) of duration similar to or shorter than the period of the sensor read cycle. Specifically, there is a risk that the sensor may be viewing a different field of view for the entire duration of the flash event. It is a particular feature of certain most preferred embodiments of the present invention that switching between the plural fields of view monitored by the imaging sensor array is performed at a frequency greater than, and preferably at least four times greater than, the read cycle rate. This requires provision of a specially configured sensor read arrangement 60 as will now be described with reference to FIGS. 5A-6.

Specifically, with reference to FIGS. 5A and 5B, sensor read arrangement 60 includes a first set of read capacitors including a capacitor 112 associated with each sensor element 64 of the two-dimensional imaging sensor array and a second set of read capacitors including a capacitor 114 associated with each sensor element 64 of the two-dimensional imaging sensor array. A sensor switching arrangement 66 is configured perform fast switching (i.e. at a rate greater than the read cycle rate) of connections from each sensor element 64 between corresponding capacitors 112, 114, synchronously with switching of the optical switching mechanism between the two fields of view, such that the first set of read capacitors 112 accumulate information corresponding to the first field of view 38a and the second set of read capacitors 114 accumulate information corresponding to the second field of view 38b. Thus, the integration time for the image of each FOV is made up of a summation of short exposures interspersed during a single read cycle of the imaging array. In this manner, the revisit delay during which a transient event in one FOV could be missed can be reduced to very much shorter than the read cycle period. The result is pseudo-continuous observation in the two FOVs while maintaining the overall sensitivity of the sensor system.

Although a basic implementation of this fast-switching methodology requires only two read capacitors per sensor element, as described up to this point, most preferred implementations employ four read capacitors per sensor element of the array to combine the fast switching methodology with the read-while-integrate approach described above. Thus, in the case illustrated here, capacitors 112 and 114 are supplemented by third and fourth sets of read capacitors 113 and 115. During a first time period as illustrated in FIG. 5A, fast optical/electrical switching is performed as described above to accumulate image data for the two FOVs in (sets of) capacitors 112 and 114 while the previous images of both FOVs are read from capacitors 113 and 115, either simultaneously or sequentially. Then, during a second half of the read-cycle, switching arrangement 66 performs fast switching between capacitors 113 and 115 while capacitors 112 and 114 are read, as illustrated in FIG. 5B. In this way, the revisit delay for each field of view can be further reduced.

Figure 11A:
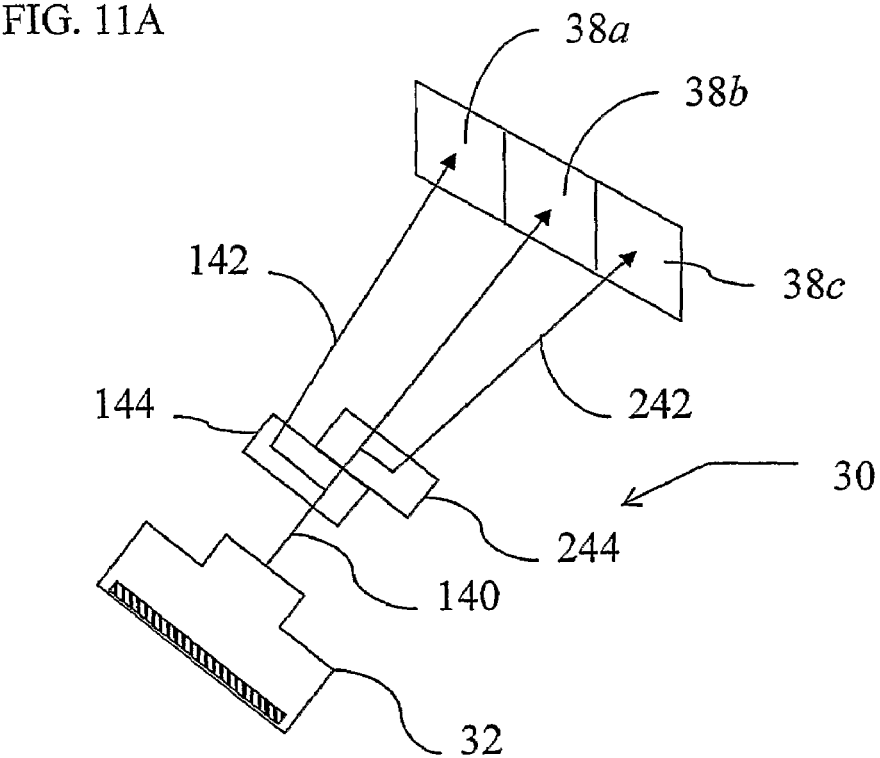
FIG. 11A illustrates schematically a further variant of the imaging system of FIG. 4 for monitoring three fields of view.

Parenthetically, it should be appreciated that the choice of four read capacitors per sensor element is sufficient for the application described, but may be increased as necessary for alternative implementations according to the present invention. Thus, for example, the band filter implementation of FIG. 7B would optimally be implemented with eight read capacitors per sensor element in order to record all four images within a read-while-integrate framework. Similarly, an imaging sensor with two optical switching mechanisms used to generate three distinct FOVs as illustrated in FIG. 11A would require six read capacitors per sensor element while that of FIG. 11B which generates four distinct FOVs would require eight read capacitors per sensor element.

It will also be clear to one ordinarily skilled in the art that the specific topography of the switching arrangements described in this example can be rearranged without departing from the principles of the present invention.

It will be appreciated that the principles of the present invention may be applied to a wide range of applications wherever it is useful to monitor a plurality of fields of view using a reduced number of staring sensors. Although applications employing a single imaging system fall within the scope of the present invention, most preferred implementations provide an imaging assembly where two or more imaging systems according to the present invention are deployed in fixed spatial relation such that the substantially non-overlapping fields of view of the plurality of imaging systems together form a substantially contiguous effective field of view spanning at least 120°, and more preferably at least 180°. For various surveillance applications, three or more field-switching imaging systems are employed to provide panoramic (360° azimuth) coverage. In this context, it will be noted that the plural FOVs of each individual imaging system need not be contiguous if the FOVs of the different imaging systems are interspersed in a complementary manner so as to together offer substantially contiguous coverage.

Figure 11B:
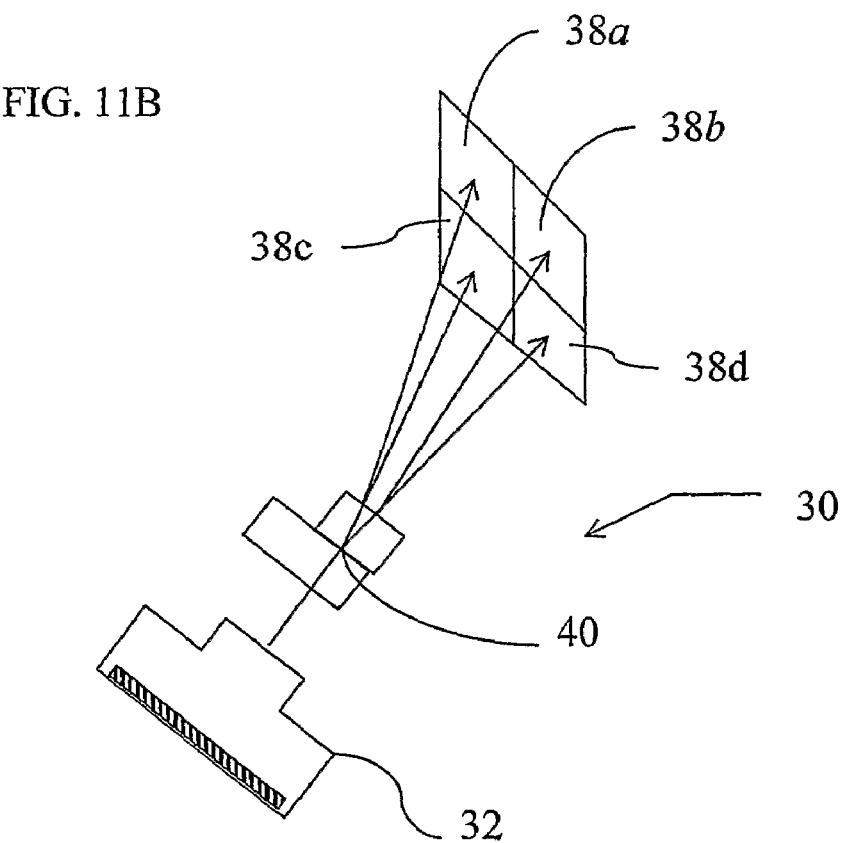
FIG. 11B illustrated schematically an further variant of the imaging system of FIG. 4 for monitoring four fields of view in a two-dimensional array layout.

As mentioned earlier, the scope of the present invention is not confined to FOV doubling, but includes, in general, M-fold FOV expansion. FIG. 11A illustrates FOV tripling according to the present invention. FIG. 1 shows imaging system 30 including two optical switching mechanisms 144 and 244 that are similar to optical switching mechanism 40 described above. For illustrational simplicity, the associated mirrors for folding the reflected optical paths 142 and 242 of the imaging system are not shown. When both mechanisms 144 and 244 are in their transparent state, the optical path of system 30 is the straight-ahead optical path of the imaging system 30. When optical switching mechanism 144 is in its reflective state, the optical path of system 30 is reflected optical path 142 corresponding to a reflected FOV to the left of the straight-ahead optical path 140 of FIG. 11A. When optical switching mechanism 144 is in its transparent state and optical switching mechanism 244 is in its reflective state, the optical path of the system is reflected optical path 242 corresponding to a reflected FOV to the right of the straight-ahead optical path 140 of FIG. 11A. FIG. 11B illustrates a further variation where two switching mechanisms are used in series with both optical axes of the first switching mechanism being further switched by a second switching mechanism to achieve four fields of view monitored by a single imaging arrangement. In the case illustrated here, the switching mechanisms operate in non-parallel planes, and preferably orthogonally, to provide a 2×2 array of fields of view 38a-38d. This option is of particular importance where the inherent elevational field of view of each sensor is too small for a given application.

Figure 12A:
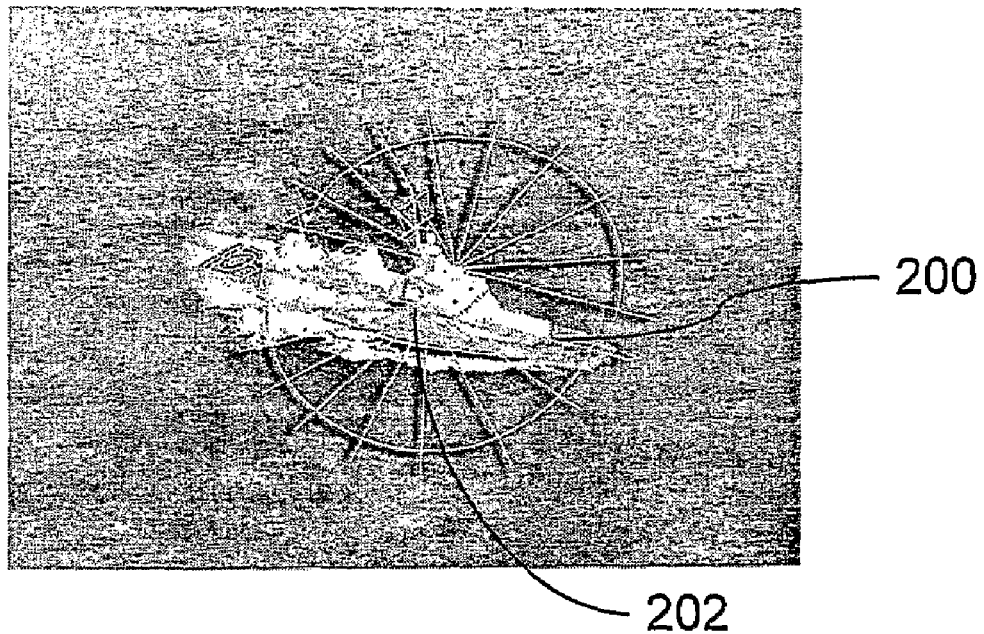
FIGS. 12A and 12B are schematic illustrations of a ship fitted with an IRST system based on a plurality of the imaging arrangements of FIG. 4, constructed and operative according to the teachings of the present invention, illustrating two different options of deployment of the sensors of the system.
Figure 12B:
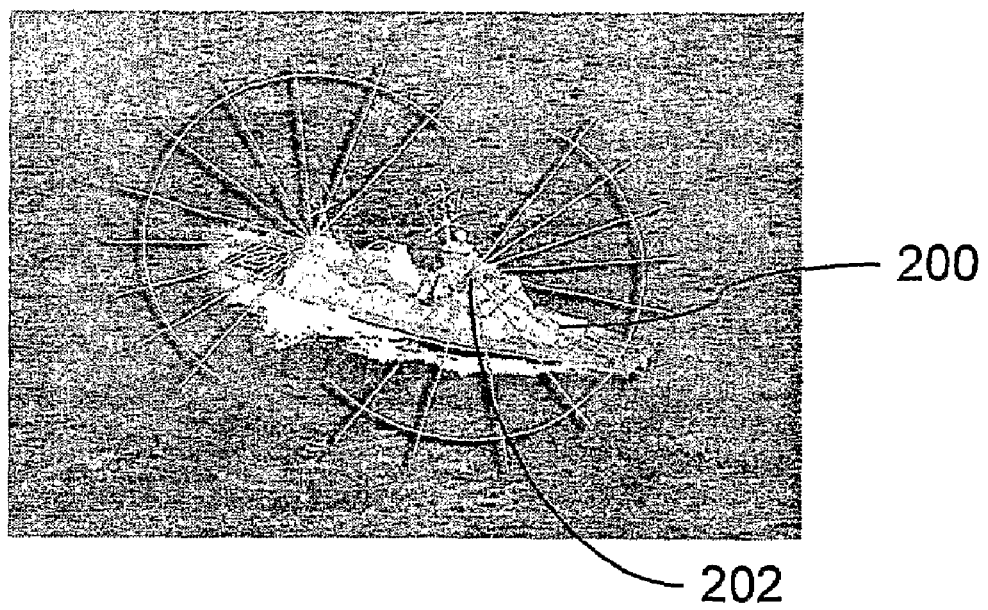
Figure 13:
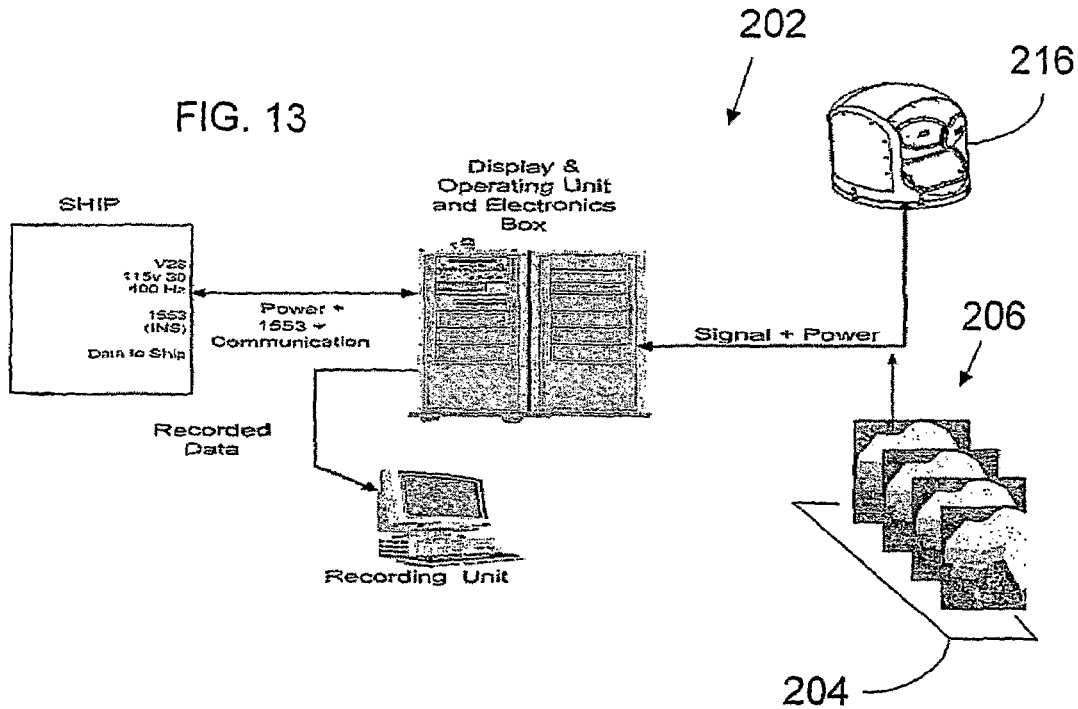
FIG. 13 is a schematic representation of the main components of the IRST system of the present invention.
Figure 14:
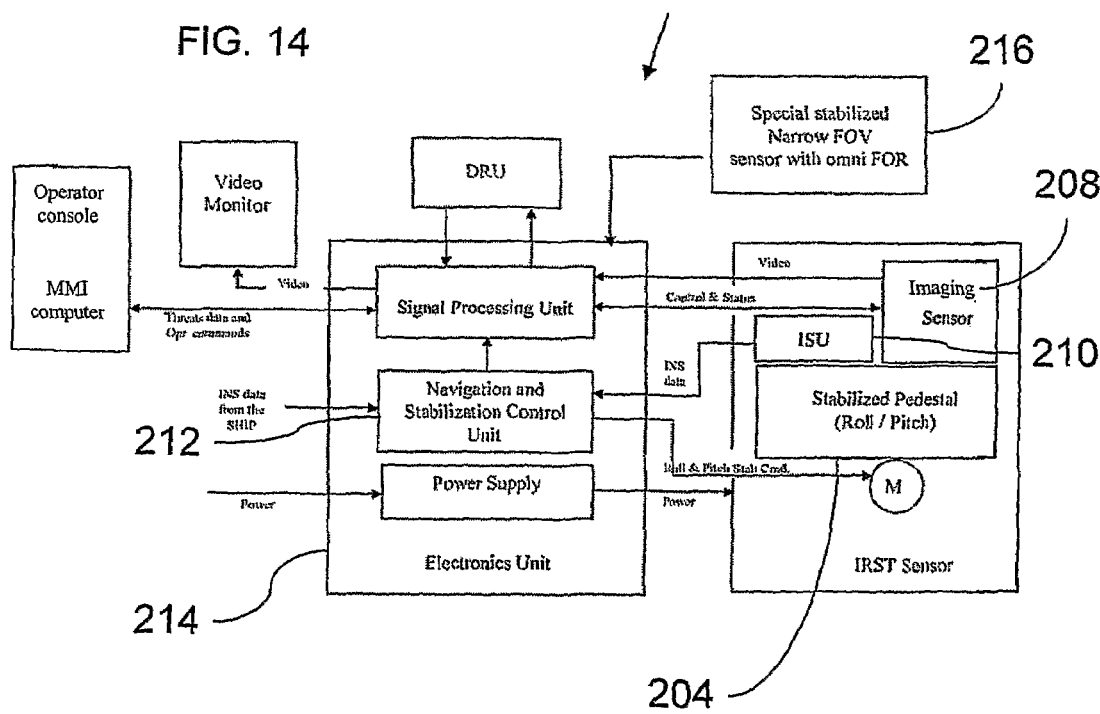
FIG. 14 is a block diagram of the IRST system of the present invention.
Figure 15:
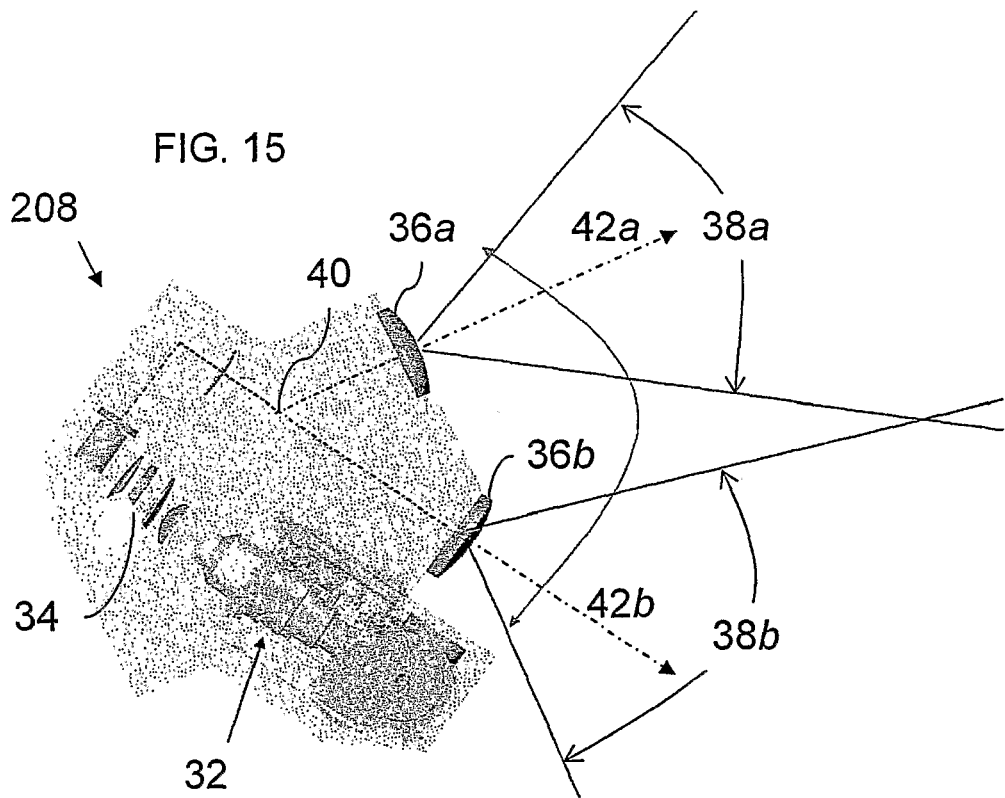
FIG. 15 is a schematic representation of a dual field-of-view imaging system for use in the IRST system of the present invention.
Figure 16:
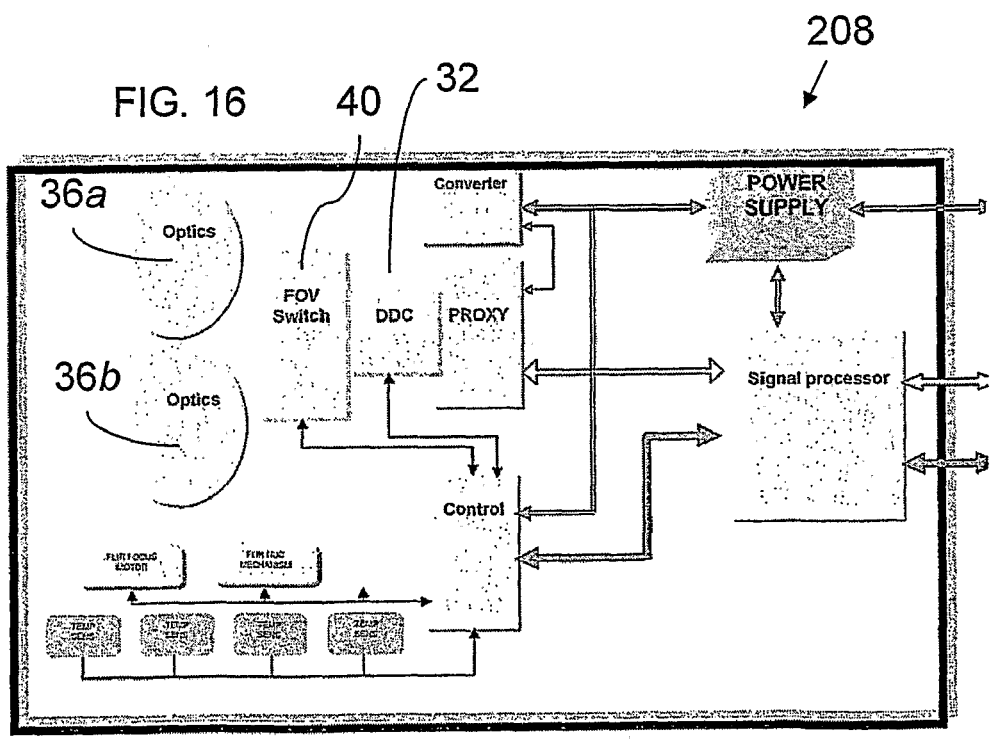
FIG. 16 is a block diagram of the dual field-of-view imaging system of FIG. 15.

Turning now to FIG. 12A-17, these illustrate a schematically an infrared search and tracking (IRST) system, generally designated 202, constructed and operative according to the teachings of the present invention and based upon imaging arrangements as described hereinabove. The coverage afforded to a ship 200 by two different configurations of the IRST system 202 are illustrated in FIGS. 12A and 12B, respectively. The components making up IRST system 202 are shown in FIGS. 13 and 14. In general terms, IRST system 202 includes at least one, and preferably two, stabilized platforms 204 upon which are deployed an imaging assembly 206 which includes a plurality of imaging systems 208. As best seen in FIGS. 15 and 16, each imaging system 208 is a non-limiting preferred implementation of imaging arrangement 30 or 30' described above, including two-dimensional imaging sensor array 32 and an optical system including: optical arrangements 34, 36a, 36b defining fields of view 38a, 38b; and optical switching mechanism 40 configured to alternately switch the optical axis of the imaging system between first direction 42a and second direction 42b. The plurality of imaging systems 208 are deployed in known spatial relation such that the fields of view of the plurality of imaging systems together form a substantially contiguous effective field of view spanning substantially 360°, as illustrated schematically in FIGS. 12A and 12B.

As before, it will be appreciated that the present invention offers profound advantages of economy in cost and size for implementation of an IRST system by multiplying the field of view which can be monitored by each imaging sensor array without any loss of spatial resolution. The system is effectively a staring system, thereby avoiding all of the aforementioned limitations of scanning systems. Thus, if an imaging system with its associated optics is configured to provide a basic field of view spanning 15°, complete coverage of a panoramic (360° azimuth) field of view can be provided by about 12 imaging systems in contrast to the 24 sensors which would be required according to the teachings of the prior art. This number can be reduced further if multiple switching is employed to provide more than two fields of view per imaging sensor. The system also preferably provides an elevation field of view of at least about 8°, in contrast to the 2°-4° of conventional scanning systems, thereby providing effective detection of air-launched missiles and gliding bombs. Furthermore, vertical switching of fields of view may additionally be used to increase the elevation field of view. For example, an imaging sensor with a basic FOV of 8°×8° may be used with horizontal and vertical switching in sequence to monitor four quadrants covering a total of roughly a 16°×16° field of view as shown in FIG. 11B.

Turning now to the features of IRST system 202 in more detail, it will be noted that the subdivision of the imaging systems between one or more stabilized platform is somewhat arbitrary. In certain cases where a suitable panoramic vantage point is available, such as high on a mast of a ship, it is possible to mount all of the required imaging systems on a common platform. In many cases, however, it is convenient for practical reasons to subdivide the imaging systems around the periphery of the vessel. In the case of FIG. 12A, this subdivision is shown between left and right of the vessel. The natural choice for such an arrangement is to subdivide the systems symmetrically such that each covers just over 180°, thereby together offering 360° coverage. In the case of FIG. 12B, a front/rear subdivision is used. Here, the subdivision may or may not be symmetrical. Although illustrated here in cases where two stabilized platforms are used, it will be clearly appreciated that there is no real limit to the number of platforms to be used and further subdivision of the imaging systems is possible.

In order to provide the required sensitivity for detecting distant head-on missiles, each of the fields of view for each imaging system preferably has a spatial resolution of at least two, and preferably at least four, pixels per mille-radian. Each imaging system field of view preferably spans a range of at least about 8° in elevation.

As already mentioned, the imaging systems of IRST system 202 are mounted on one or more stabilized platform 204. Such platforms, well known in the art and commercially available from numerous sources, typically provide isolation from gross motions of pitch and roll of a ship, but do not compensate motions sufficiently to completely eliminate their impact on high resolution images such as those of the IRST system 202. Accordingly, most preferred implementations of the present invention provide a fine stabilization arrangement (see FIG. 14) including an inertial sensor arrangement 210 associated with stabilized platform 204 for measuring residual motion of the stabilized platform, and a stabilization module 212 responsive to inertial sensor arrangement 210 to process images from the imaging assembly so as to correct the images so as to compensate for the residual motion. Stabilization module 212 is preferably implemented as part of a main processing system 214 which performs all of the functions of image processing, analysis, target detection and tracking for the IRST system 202. Preferably, inertial sensor arrangement 210 provides output indicative of platform motion with a resolution better than 1 mille-radian, and more preferably, of the order of 0.1 mille-radian. This allows stabilization of images processed at sub-pixel resolution, thereby greatly increasing the reliability of "point" target detection.

One of the functions preferably performed by processing system 214 is processing images from the imaging systems according to a set of target detection criteria to identify suspected targets. Of particular importance is a detection criterion requiring substantially continuous detection of a suspected target for a period in excess of about half a second. This criterion is highly effective for eliminating false alarms due to background optical noise, and particularly solar glint from the surface of the sea.

Figure 17:
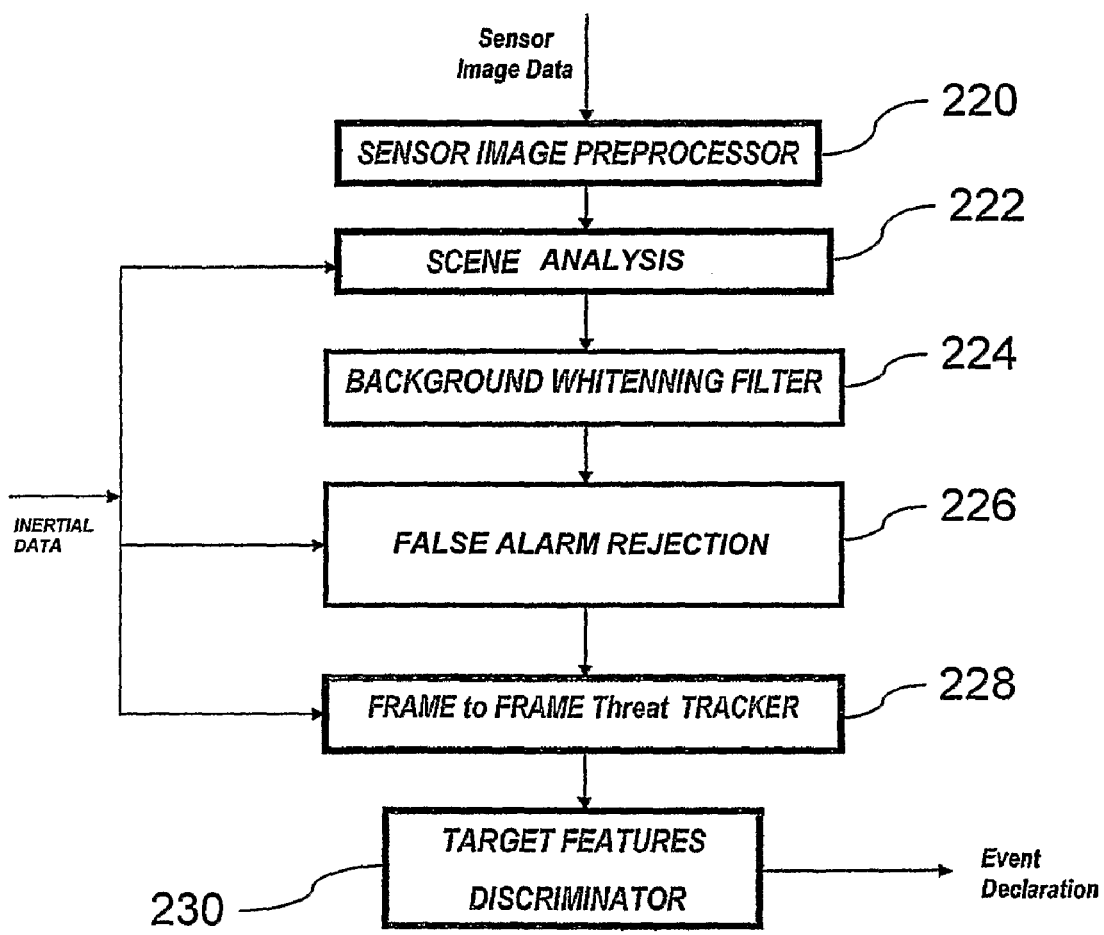
FIG. 17 is a flow diagram illustrating a sequence of processing of images from the imaging sensors of the present invention according to a set of target detection criteria.

Turning now to FIG. 17, this illustrates in more detail a non-limiting preferred implementation of the target detection algorithms implemented by the system of the present invention. Specifically, after initial preprocessing such as application of a non-uniformity correction (NUC) and combining of the separate sensor images into a mosaic (step 220), the scene is preferably segmented into regions (step 222), such as "sea", "sky" and "land", each of which tends to have different background noise characteristics and therefore benefits from independent processing. Segmentation techniques suitable for segmenting the scene according to various known characteristics are well known in the art and will not be addressed here in detail. The segments of the image are then processed by various contrast enhancement techniques (step 224), chosen to be appropriate for each type of background, so as to facilitate target detection. One such technique which may be useful is referred to as "whitening" which removes all components other than the high spatial frequencies which are relevant for target detection. The technique is referred to as "whitening" because the remaining picture is largely void of perceivable image data, and is primarily the "white noise" of the sensed image together with the data relevant for target sensing. The processing then proceeds with false alarm rejection 226 which implements various false alarm rejection algorithms, preferably including but not limited to the rejection of suspected targets which do not persist for a requisite minimum time period, preferably of at least about half a second. The processing then continues with frame-to-frame tracking of suspected targets (step 228) to verify that the spatial and temporal variations of the suspected target correspond to possible scenarios of behavior of a real target, and to maintain position tracking of the target. Finally, the image of the target is checked against various criteria and/or look-up tables of characteristic targets in an attempt to classify the tracked object, for example, as a verified target, verified non-threatening object or an unclassified potential threat. According to the result of this classification, an event requiring further action (automatic, semi-automatic or manual) may be declared.

According to one preferred option, IRST system 202 also includes a gimbaled narrow field-of-view infrared imaging sensor 216 (FIGS. 13 and 14) having a field of view not greater than about 3° which is used for further action after detection of a threat or potential threat. Gimbaled narrow field-of-view infrared imaging sensor 216 is preferably associated with processing system 214 for directing towards suspected targets for evaluation of the suspected targets. This provides additional higher resolution information for automated classification of a target and/or offers a human operator a visual display of the suspected target for evaluation. The narrow field-of-view infrared imaging sensor 216 is preferably gimbaled to provide a field of regard (FOR) giving 360° azimuth coverage and a range of elevations greater than the coverage of imaging assembly 206. Most preferably, the gimbal provides high ranges of elevation (spanning at least 60°, and most preferably 90-100°) to offer roughly hemispherical coverage for continuous tracking of a detected target outside the field of view of imaging assembly 206.

In all other respects, it should be appreciated that imaging systems 208 are preferably implemented according to any or all features described above in the context of imaging systems 30 and 30'. For example, IRST system 202 is preferably configured for detecting both slowly varying targets, such as incoming missiles in flight, i.e., with a time constant greater than that of the background solar clutter, and transient "flash" events, such as the launching of a missile, with a time constant less than that of the background solar clutter. For this purpose, the imaging system preferably includes fast switching and other features described above which are helpful in detection of transient flash events.

Although the above illustration has been given in the context of application to a navel vessel, it will be appreciated that the present invention may equally be applied to other IRST systems or other types of surveillance systems from other land-based, airborne or satellite platforms. Details of such implementations, and modifications where necessary, will all be clear to one ordinarily skilled in the art by analogy to the above description.

While the invention has been described with respect to a limited number of embodiments, it will be appreciated that many variations, modifications and other applications of the invention may be made within the scope of the invention as defined by the appended claims.

What is claimed is:

1. An imaging system comprising:
 (a) a two-dimensional imaging sensor array;
 (b) an optical system including:
  (i) at least one optical arrangement associated with the imaging sensor array and defining a field of view of given angular dimensions; and (ii) an optical switching mechanism for alternately switching an optical axis of the imaging system between a first direction and a second direction, said optical switching mechanism and said at least one optical arrangement being deployed such that said imaging sensor array generates images of at least two substantially non-overlapping fields of view of equal angular dimensions, said substantially non-overlapping fields of view having diverging optical axes in fixed spatial relation;

(c) a first set of read capacitors including a capacitor associated with each sensor element of said two-dimensional imaging sensor array;

(d) a second set of read capacitors including a capacitor associated with each sensor element of said two-dimensional imaging sensor array; and (e) a sensor switching arrangement associated with said two-dimensional imaging sensor array, said first and second sets of read capacitors and said optical switching mechanism, said sensor switching arrangement being configured to switch connections from each sensor element of said two-dimensional imaging sensor array between corresponding capacitors of said first and second sets of read capacitors synchronously with switching of said optical switching mechanism between said two fields of view such that said first set of read capacitors accumulate information corresponding to a first of said two fields of view and said second set of read capacitors accumulate information corresponding to a second of said two fields of view.

2. The imaging system of claim 1, wherein said optical switching mechanism includes an apparatus that is alternately substantially transparent and substantially reflective.

3. The imaging system of claim 1, wherein said optical switching mechanism includes a rotatable disk including at least one pair of alternating segments, a first segment of each said pair being transparent and a second segment of each said pair being reflective.

4. The imaging system of claim 3, wherein said at least one pair includes at least two pairs of segments, wherein said transparent segments are transparent to non-identical ranges of wavelengths and said reflective segments are reflective to non-identical ranges of wavelengths.

5. The imaging system of claim 1, wherein said optical switching mechanism includes a plurality of microelectromechanical shutters, said apparatus being substantially transparent when said shutters are open and substantially reflective when said shutters are closed.

6. The imaging system of claim 1, wherein said optical switching mechanism includes a pair of prisms and a prism displacement mechanism operative to displace at least one of said pair of prisms such that said pair of prisms are alternately adjacent and apart, said apparatus being substantially transparent when said prisms are adjacent and substantially reflective when said prisms are apart.

7. An imaging assembly comprising a plurality of imaging systems according to claim 1, wherein said imaging systems are deployed in fixed spatial relation such that said substantially non-overlapping fields of view of said plurality of imaging systems together form a substantially contiguous effective field of view spanning at least 120°.

8. The imaging assembly of claim 7, wherein said substantially contiguous effective field of view spans at least 180°.

9. The imaging assembly of claim 7, wherein said substantially contiguous effective field of view spans 360°.

10. The imaging assembly of claim 7, wherein said plurality of said imaging systems includes at least three of said imaging systems.

11. The imaging system of claim 1, wherein said sensor switching arrangement switches said connections at a field-of-view switching rate, the imaging system further comprising a read arrangement for reading accumulated information from said first and second sets of read capacitors at a read cycle rate, wherein said field-of-view switching rate is greater than said read cycle rate.

12. The imaging system of claim 11, further comprising:
(a) a third set of read capacitors including a capacitor associated with each sensor element of said two-dimensional imaging sensor array; and
(b) a fourth set of read capacitors including a capacitor associated with each sensor element of said two-dimensional imaging sensor array, wherein said sensor switching arrangement and said read arrangement are further associated with said third and fourth sets of read capacitors, said sensor switching arrangement and said read arrangement being configured such that:
(i) during a first half of said read cycle, said sensor switching arrangement switches connections from each sensor element of said two-dimensional imaging sensor array between corresponding capacitors of said first and second sets of read capacitors synchronously with switching of said optical switching mechanism between said two fields of view while said read arrangement reads said third and fourth sets of read capacitors; and
(ii) during a second half of said read cycle, said sensor switching arrangement switches connections from each sensor element of said two-dimensional imaging sensor array between corresponding capacitors of said third and fourth sets of read capacitors synchronously with switching of said optical switching mechanism between said two fields of view while said read arrangement reads said first and second sets of read capacitors.

13. The imaging system of claim 1, further comprising a processor configured for analyzing a sequence of images from said imaging system to determine whether they indicate the presence of a transient event.

14. An infrared search and tracking (IRST) system for a waterborne vessel, the system comprising:
(a) at least one stabilized platform; and
(b) an imaging assembly deployed on said at least one stabilized platform, said imaging assembly including a plurality of the imaging systems of claim 1, wherein said imaging systems are deployed in fixed spatial relation such that said fields of view of said plurality of imaging systems together form a substantially contiguous effective field of view spanning substantially 360°.

15. The IRST system of claim 14, wherein said at least one stabilized platform is implemented as a plurality of said stabilized platforms, and wherein each of said stabilized platforms carries a corresponding subgroup of said plurality of imaging systems, said subgroup providing fields of view which together form a substantially contiguous effective field of view spanning a corresponding given angle, said corresponding given angles together substantially spanning 360°.

16. The IRST system of claim 14, wherein said at least one stabilized platform is implemented as two stabilized platforms for deployment on opposite sides of the waterborne vessel, and wherein a first of said stabilized platforms carries a first subgroup of said plurality of imaging systems, said first subgroup providing fields of view which together form a substantially contiguous effective field of view spanning at least a first angle, and wherein the second of said stabilized platforms carries a second subgroup of said plurality of imaging systems, said second subgroup providing fields of view which together form a substantially contiguous effective field of view spanning at least 360° minus said first angle, said first and second subgroups thereby together providing an effective field of view substantially spanning 360°.

17. The IRST system of claim 14, wherein said at least one stabilized platform is stabilized to within a predefined level of precision, the system further comprising a fine stabilization arrangement including:
(a) an inertial sensor arrangement associated with said stabilized platform for measuring residual motion of said stabilized platform; and
(b) a processing system responsive to said inertial sensor arrangement to process images from said imaging assembly so as to correct said images so as to compensate for said residual motion.

18. The IRST system of claim 14, wherein each of said fields of view for each imaging system has a spatial resolution of at least two pixels per milliradian.

19. The IRST system of claim 14, wherein said substantially contiguous effective field of view spans substantially 360° in azimuth and spans a range of at least about 8° in elevation.

20. The IRST system of claim 14, further comprising a processing system associated with said imaging assembly and configured to process images from said imaging systems according to a set of target detection criteria to identify suspected targets.

21. The IRST system of claim 20, wherein said target detection criteria include substantially continuous detection of a suspected target for a period in excess of about half a second.

22. The IRST system of claim 20, further comprising a gimbaled narrow field-of-view infrared imaging sensor having a field of view not greater than about 3°, said gimbaled narrow field-of-view infrared imaging sensor being associated with said processing system for directing towards suspected targets for evaluation of the suspected targets.

23. The IRST system of claim 14, wherein said optical switching mechanism is configured to switch said optical axis of the imaging system in two non-parallel switching planes such that each imaging system generates images of at least four fields of view forming a two-dimensional array of fields of view.

24. An infrared search and tracking (IRST) system comprising an imaging assembly including a plurality of the imaging systems of claim 1, wherein said imaging systems are deployed in fixed spatial relation such that said fields of view of said plurality of imaging systems together form a substantially contiguous effective field of view spanning at least about 40°.

25. A method for acquiring images of two fields of view using a single two-dimensional imaging sensor array, the method comprising:
(a) providing an optical arrangement including an optical switching mechanism for alternately directing an image of the two fields of view onto the imaging sensor array;
(b) providing for each sensor of the imaging sensor array at least one pair of read capacitors and a sensor switching arrangement for switching a connection from each of said sensors between the corresponding pair of read capacitors;
(c) synchronously operating said optical switching mechanism and said sensor switching arrangement at a field-of-view switching rate such that a first of said pair of read capacitors accumulates information corresponding to a pixel of a first of the fields of view and a second of said pair of read capacitors accumulates information corresponding to a pixel of a second of the fields of view; and
(d) reading accumulated information from said pairs of read capacitors at a read cycle rate so as to acquire a sequence of images of each of the two fields of view, wherein said field-of-view switching rate is greater than said read cycle rate.

26. The method of claim 25, wherein said field-of-view switching rate is at least four times said read cycle rate.

27. The method of claim 25, further comprising analyzing said sequence of images to determine whether they indicate the presence of a transient event.

* * * * *

UNITED STATES PATENT AND TRADEMARK OFFICE
CERTIFICATE OF CORRECTION

PATENT NO. : 7,564,031 B2  Page 1 of 1
APPLICATION NO. : 11/817795
DATED : July 21, 2009
INVENTOR(S) : Fein et al.

It is certified that error appears in the above-identified patent and that said Letters Patent is hereby corrected as shown below:

Title Page, Item (12) delete "Fine et al." and insert --Fein et al.--.

Title Page, Item (75) Inventors, should read

--(75) Inventors: Asa Fein, Shchenia (IL); Chanoch Miller, Gesher Haziv (IL); Ram Fabian, Haifa (IL)--.

Signed and Sealed this
Twenty-fourth Day of November, 2015

Michelle K. Lee
*Director of the United States Patent and Trademark Office*